(12) United States Patent
Masuda

(10) Patent No.: US 11,343,406 B2
(45) Date of Patent: May 24, 2022

(54) IMAGE READING APPARATUS, IMAGE READING SYSTEM, IMAGE READING METHOD, AND NON-TRANSITORY COMPUTER-READABLE STORAGE MEDIUM STORING PROGRAM

(71) Applicant: SEIKO EPSON CORPORATION, Tokyo (JP)

(72) Inventor: Hidetoshi Masuda, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/215,202

(22) Filed: Mar. 29, 2021

(65) Prior Publication Data

US 2021/0306519 A1 Sep. 30, 2021

(30) Foreign Application Priority Data

Mar. 30, 2020 (JP) .............................. JP2020-060395

(51) Int. Cl.
*H04N 1/04* (2006.01)
*H04N 1/387* (2006.01)
*H04N 1/00* (2006.01)

(52) U.S. Cl.
CPC ....... *H04N 1/3878* (2013.01); *H04N 1/00331* (2013.01); *H04N 1/00336* (2013.01); *H04N 1/3873* (2013.01)

(58) Field of Classification Search
CPC ............. H04N 1/3878; H04N 1/00331; H04N 1/00336; H04N 1/3873

USPC .................................................. 358/488, 474
See application file for complete search history.

(56) References Cited

U.S. PATENT DOCUMENTS

| 2009/0185240 | A1* | 7/2009 | Kato .................. H04N 1/00718 358/474 |
| 2017/0094111 | A1* | 3/2017 | Shimahashi ......... H04N 1/3878 |
| 2018/0249040 | A1 | 8/2018 | Hayashi |
| 2019/0354755 | A1* | 11/2019 | Miyauchi ............ G06V 10/243 |

FOREIGN PATENT DOCUMENTS

JP 2018-139371 A 9/2018

* cited by examiner

Primary Examiner — Gabriel I Garcia
(74) Attorney, Agent, or Firm — Workman Nydegger

(57) ABSTRACT

A control portion performs a predetermined detection process on a first image from a first reading portion and a second image from a second reading portion. When the detection process on the each image is successful, the control portion performs, based on a value of an image processing variable specified from a detection result, predetermined image processing on the each image, When the detection process on the image of one side fails, a value of an image processing variable for the image of one side is specified based on a value of an image processing variable specified from the detection result for the image of the other side for which detection is successful. Based on the specified value of the image processing variable, image processing is performed on the image of one side.

9 Claims, 18 Drawing Sheets

IMAGE READING APPARATUS, IMAGE READING SYSTEM, IMAGE READING METHOD, AND NON-TRANSITORY COMPUTER-READABLE STORAGE MEDIUM STORING PROGRAM

The present application is based on, and claims priority from JP Application Serial Number 2020-060395, filed Mar. 30, 2020, the disclosure of which is hereby incorporated by reference herein in its entirety.

BACKGROUND

1. Technical Field

The present disclosure relates to an image reading apparatus, an image reading system, an image reading method, and a non-transitory computer-readable storage medium storing a program for reading an original document to acquire an image.

2. Related Art

For example, JP-A-2018-139371 discloses an image reading apparatus including a reading portion reading an original document. Such an image reading apparatus performs a tilt correction process of correcting a tilt of a read image. In the tilt correction process, a tilt angle of an original document region in the read image is detected, and the original document region is rotated by the tilt angle in a direction of eliminating the tilt of the original document region. The image reading apparatus performs a cutout process of cutting out the original document region in the read image. The image reading apparatus may perform a rotation process of rotating an original document region in a predetermined orientation in order to align an orientation of the original document region. There is an image reading apparatus that can read both sides such as a front side and a rear side of an original document.

However, in the image reading apparatus disclosed in JP-A-2018-139371, the original document region in the read image may not detectable. Examples of cases in which the read image is not detectable include a case where the boundary line is erroneously detected because a boundary line between the original document region and a background region in the read image is unclear or because of wrinkles of an original document. In that case, since a tilt angle of the original document region cannot be detected, predetermined image processing such as a tilt correction process of correcting a tilt of the original document region or a cutout process of cutting out the original document region cannot be performed or is inappropriately performed. Therefore, an inappropriate image not subjected to the appropriate predetermined image processing is output. Thus, there is a problem in that the frequency of obtaining an image of an original document subjected to appropriate image processing is reduced. Therefore, it is desirable to reduce the frequency of outputting an inappropriate image of an original document. In particular, in an image reading apparatus that reads both sides of an original document, an image of one side of the images obtained by reading both sides of the original document may be subjected to appropriate image processing, but an image of the other side may not be subjected to appropriate image processing. Therefore, it is desirable to reduce the frequency of outputting an inappropriate image of an original document.

SUMMARY

According to an aspect of the present disclosure, there is provided an image reading apparatus that reads an original document to acquire an image, the image reading apparatus including a first reading portion that reads a first side of the original document to acquire a first image; a second reading portion that reads a second side that is an opposite side to the first side of the original document to acquire a second image; and a control portion that performs a predetermined detection process on the first image and performs the predetermined detection process on the second image, in which, when the predetermined detection process is successful for the first image, the control portion performs, based on a value of an image processing variable specified from a detection result of the predetermined detection process, predetermined image processing on the first image, when the predetermined detection process is successful for the second image, the control portion performs, based on a value of an image processing variable specified from a detection result of the predetermined detection process, the predetermined image processing on the second image, and, when the predetermined detection process on an image of one side of the first side and the second side fails, the control portion specifies, based on a value of an image processing variable specified from a detection result of the predetermined detection process on an image of the other side for which the predetermined detection process is successful among the first side and the second side, a value of an image processing variable for the image of the one side, and performs, based on the specified value of the image processing variable, the predetermined image processing on the image of the one side.

According to another aspect of the present disclosure, there is provided an image reading method of reading an original document to acquire an image, the image reading method including reading a first side and a second side of the original document, performing a predetermined detection process on a first image obtained by reading the first side of the original document and performing the predetermined detection process on a second image obtained by reading the second side that is an opposite side to the first side of the original document, and when the predetermined detection process is successful for the first image, performing, based on a value of an image processing variable specified from a detection result of the predetermined detection process, predetermined image processing on the first image, when the predetermined detection process is successful for the second image, performing, based on a value of an image processing variable specified from a detection result of the predetermined detection process, the predetermined image processing on the second image, and, when the predetermined detection process on an image of one side of the first side and the second side fails, specifying, based on a value of an image processing variable specified from a detection result of the predetermined detection process on an image of the other side for which the predetermined detection process is successful among the first side and the second side, a value of an image processing variable for the image of the one side, and performing, based on the specified value of the image processing variable, the predetermined image processing on the image of the one side.

According to still another aspect of the present disclosure, there is provided a non-transitory computer-readable storage medium storing a program executed by a computer that performs a process of reading an original document to acquire an image, the program causing the computer to execute performing a predetermined detection process on a first image obtained by reading a first side of the original document and performing the predetermined detection process on a second image obtained by reading a second side that is an opposite side to the first side of the original document, and when the predetermined detection process is successful for the first image, performing, based on a value of an image processing variable specified from a detection result of the predetermined detection process, predetermined image processing on the first image, when the predetermined detection process is successful for the second image, performing, based on a value of an image processing variable specified from a detection result of the predetermined detection process, the predetermined image processing on the second image, and, when the predetermined detection process on an image of one side of the first side and the second side fails, specifying, based on a value of an image processing variable specified from a detection result of the predetermined detection process on an image of the other side for which the predetermined detection process is successful among the first side and the second side, a value of an image processing variable for the image of the one side, and performing, based on the specified value of the image processing variable, the predetermined image processing on the image of the one side.

DESCRIPTION OF EXEMPLARY EMBODIMENTS

First Embodiment

Hereinafter, a first embodiment of an image reading apparatus will be described with reference to the drawings.

Figure 1:
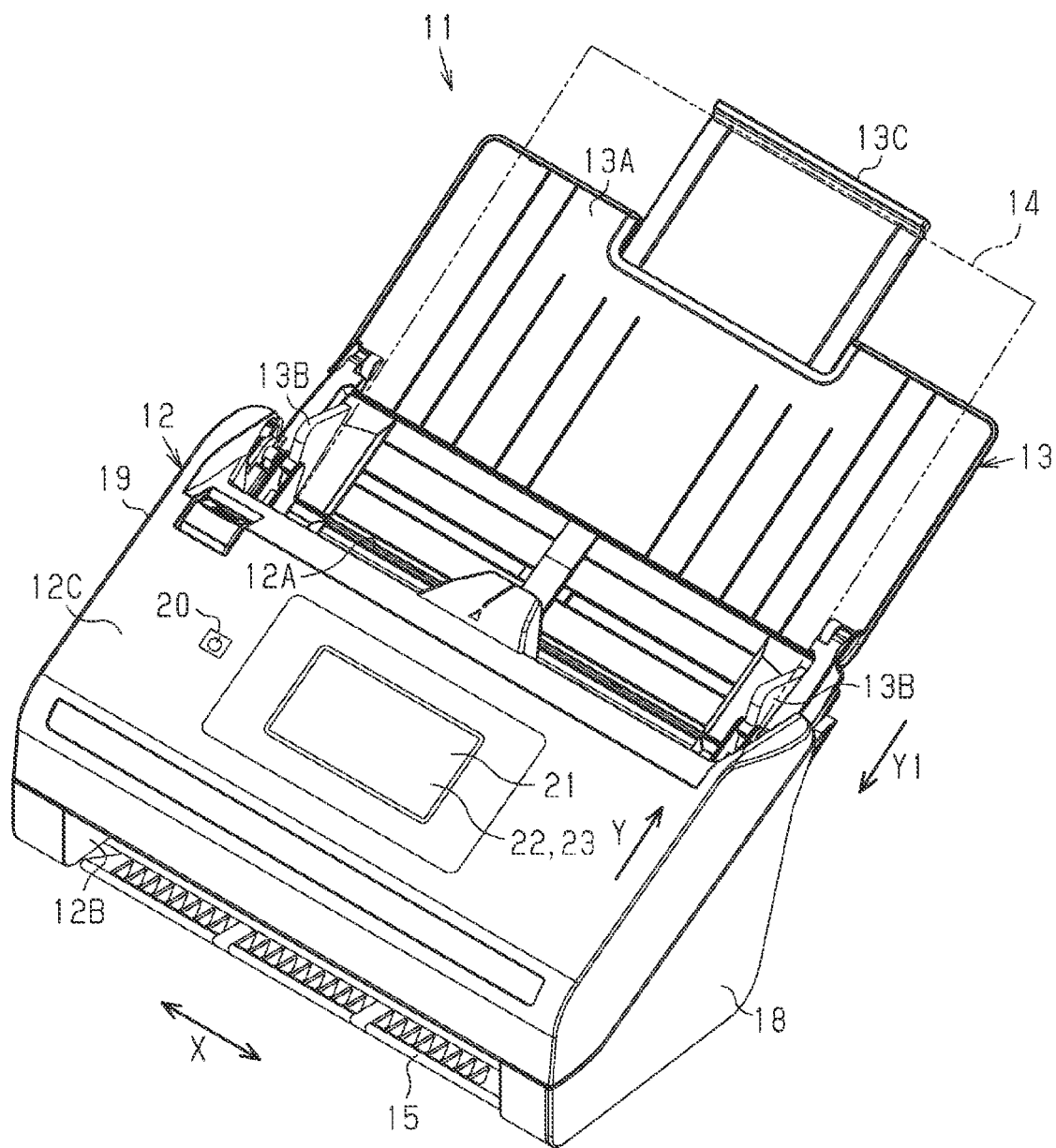
FIG. 1 is a perspective view illustrating an image reading apparatus according to a first embodiment.

As illustrated in FIG. 1, an image reading apparatus 11 of the present embodiment includes a main body 12 having a substantially trapezoidal shape in a side view, and an original document support 13 on which an original document 14 that is an image reading target is mount (set). A stacker 15 is stored in the main body 12 under a discharge port 12B so as to be slidable in a front-rear direction.

The original document support 13 has a planar platen 13A on which a plurality of original documents 14 are mountable by extending obliquely upward to the rear side of the main body 12. The original document support 13 is provided with a pair of edge guides 13B that are slidable in a width direction X that intersects (particularly orthogonal to) a transport direction Y1 in which the original document 14 is transported. The original document 14 loaded on the platen 13A is sandwiched between the pair of edge guides 13B to be positioned in the width direction X with respect to a feed port 12A. The platen 13A of the original document support 13 is provided with a slide-type auxiliary support portion 13C to be movable in and out. The original document 14 loaded on the platen 13A is brought into contact with the slide-type auxiliary support portion 13C to be positioned in the transport direction Y1 with respect to the feed port 12A. The width direction X is a main scanning direction when the image reading apparatus 11 reads the original document 14, and a direction opposite to the transport direction Y1 is the sub-scanning direction Y. Hereinafter, the width direction X will also be referred to as a main scanning direction X.

The original documents 14 mounted on the original document support 13 are fed one by one from the feed port 12A opened at the upper part of the main body 12 into the main body 12. The fed original document 14 is transported in the main body 12 along a predetermined transport path 29 (refer to FIG. 2), and, an image thereof is read in a reading region SA during the transport, and the original document 14 is discharged from the discharge port 12B that is opened on a lower front side of the main body 12.

A power button 20 is provided on a front surface portion 12C of the main body 12. The front surface portion 12C of the main body 12 is provided with a display portion 22 such as a liquid crystal panel displaying a predetermined image in a display region 23. Menus, selection items, or information such as an operation status of the image reading apparatus 11 are displayed on the display portion 22. The display portion 22 is provided with an operation portion 21 such as a touch panel that detects a user's touch operation. The operation portion 21 is configured to input necessary information according to the user's touch operation when an instruction is given to the image reading apparatus 11.

Figure 2:
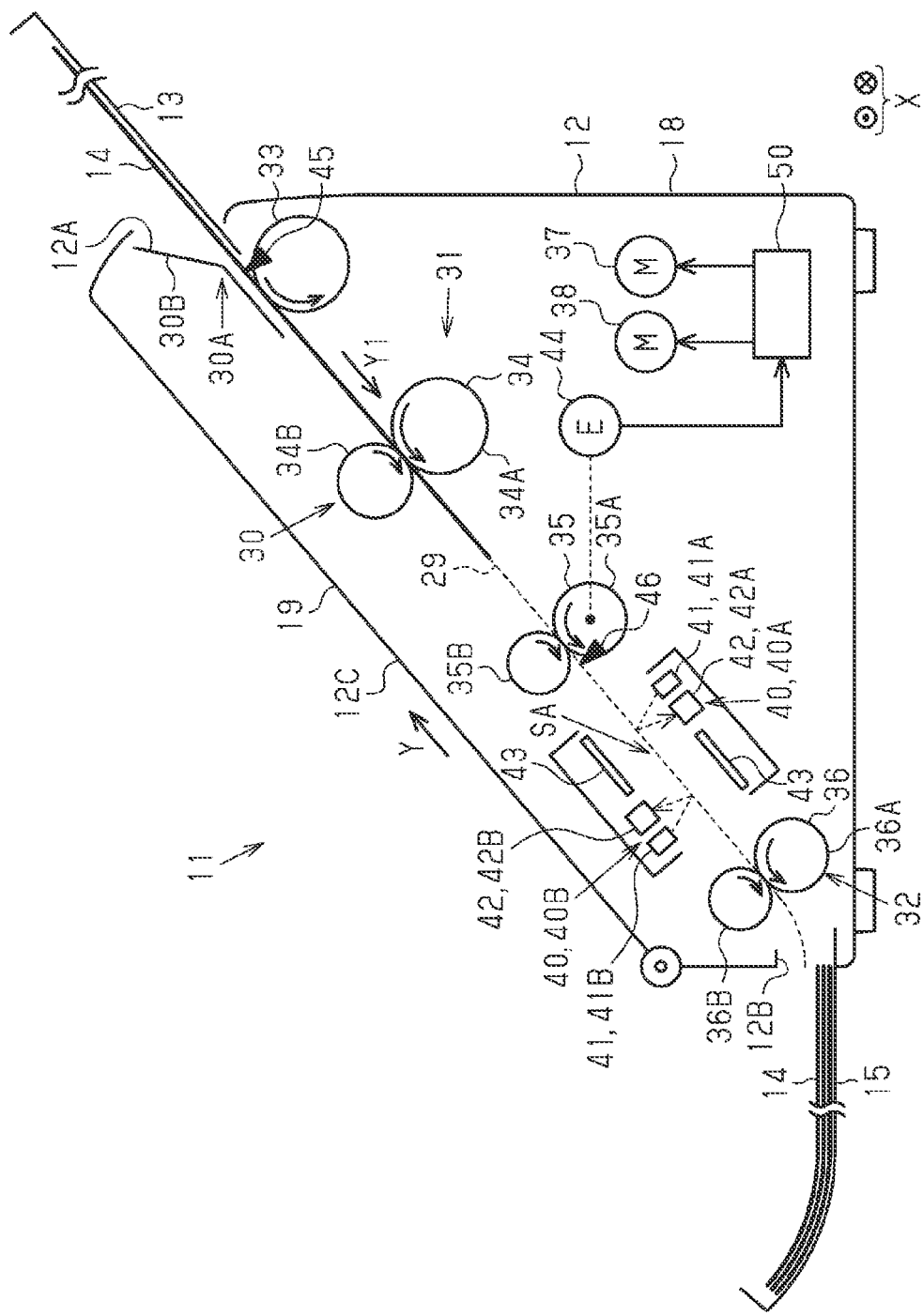
FIG. 2 is a schematic side sectional view illustrating the image reading apparatus.

As illustrated in FIG. 2, the main body 12 includes a main body portion 18 and a cover portion 19 rotatably coupled around a front end portion of the main body portion 18. The main body 12 has the transport path 29 (transport passage) extending from the feed port 12A to the discharge port 12B between the main body 18 and the cover portion 19.

A transport mechanism 30 transporting the original document 14 is provided in the main body 12. The transport mechanism 30 includes a feed portion 30A that feeds the original documents 14 loaded (set) on the original document support 13 one by one while guiding the original documents 14 to the main body 12, a transport portion 31 that transports the fed original documents 14 along the transport path 29 to pass through the reading region SA, and a discharge portion 32 that discharges the original document 14 after an image is read during the transport using the transport portion 31. The transport mechanism 30 has an automatic document feed function of sequentially transporting a plurality of original documents 14 loaded on the original document support 13 one by one along the transport path 29 to pass through the reading region SA.

The feed portion 30A is provided with a single feed roller 33 (pickup roller) facing a feed guide 30B at an upstream end position of the transport path 29 in the main body 12. The feed portion 30A feeds a plurality of original documents 14 loaded on the original document support 13 one by one from the feed port 12A along the feed guide 30B.

The transport portion 31 includes a feed roller pair 34 arranged at a position downstream of the feed roller 33 in the transport direction Y1 and a transport roller pair 35 arranged at a position upstream of the reading region SA in the transport direction Y1. The feed roller pair 34 includes a driving roller 34A and a separation roller 34B (retard roller). The transport roller pair 35 includes a driving roller 35A and a driven roller 35B.

The discharge portion 32 includes a discharge roller pair 36 arranged at a position downstream of the reading region SA in the transport direction Y1. The discharge roller pair 36 includes a driving roller 36A and a driven roller 36B. The discharge roller pair 36 transports the original document 14 that is being read along with the transport roller pair 35.

As described above, the feed roller 33, the feed roller pair 34, the transport roller pair 35, and the discharge roller pair 36 are disposed in this order from the upstream in the transport direction Y1, and the pair thereof are arranged with a gap in the width direction X.

The plurality of rollers 33 and 34A of the feed system are rotationally driven by power of a feed motor 37 that is a power source for the rollers. The plurality of original documents 14 loaded on the original document support 13 are fed from the feed port 12A into the main body 12 in order from the lowest one by the feed roller 33. In the above-described way, the feed portion 30A (the rollers 33 and 34A and the like) is driven by the feed motor 37 as a power source.

The separation roller 34B of the feed system and the driving rollers 35A and 36A of the transport system are rotationally driven by the power of a transport motor 38 that is a power source thereof. The original document 14 fed into the main body 12 by the feed roller 33 is transported to the reading region SA and is then discharged from the discharge port 12B. In the above-described way, the transport portion 31 (the transport roller pair 34 and the like) and the discharge portion 32 (the discharge roller pair 36 and the like) are driven using the transport motor 38 as a common power source.

The driving rollers 35A and 36A are rotationally driven to transport the original document 14 at the same transport speed (reading speed) when the original document 14 is read. The driven rollers 35B and 36B are rotated due to rotation of the driving rollers 35A and 36A which are respectively paired therewith.

An encoder 44 (for example, a rotary encoder) detecting rotation of one driving roller of the transport system among the plurality of roller pairs 34 to 36 is provided in the main body 12. The encoder 44 outputs a detection signal including the number of pulses proportional to an amount of rotation of the driving roller to a control portion 50 (controller). Therefore, the control portion 50 can recognize a position (transport position) and a transport speed of the original document 14 that is being transported based on the detection signal from the encoder 44.

An original document sensor 45 that detects the presence of the original document 14 set on the original document support 13 is disposed between the feed guide 30B and the feed roller 33. The original document sensor 45 is, for example, a contact type sensor having a lever, and is turned on when the original document 14 is set on the original document support 13 and the set original document 14 pushes the lever.

An original document presence sensor 46 detecting the presence of the original document 14 is disposed at a position slightly downstream of the nip of the transport roller pair 35 in the transport direction Y1. The original document presence sensor 46 is, for example, a contact type sensor having a lever (contactor). The original document presence sensor 46 is turned on by detecting the original document 14 when a leading end of the original document 14 pushes the lever, and is turned off when a trailing end of the original document 14 passes and thus the lever is not pushed such that the original document 14 is not detected. Therefore, the control portion 50 detects that the leading end of the original document 14 has passed through the transport roller pair 35 and the trailing end of the original document 14 has passed through the transport roller pair 35 based on a detection signal (ON/OFF) from the original document presence sensor 46. The detection result from the original document presence sensor 46 detecting the leading end and the trailing end of the original document 14 is used for control for determining start and end timings of a reading operation of reading portions 40 (40A and 40B) described later. The original document presence sensor 46 can detect the leading end and the trailing end of the original document 14, and may also detect a length of the original document 14 in the transport direction Y1, that is, an original document size defined by the length, based on a transport distance of the original document 14 from detection of the leading end of the original document 14 to the detection of the trailing end thereof. The original document presence sensor 46 may be a non-contact type sensor such as an optical sensor.

The reading portions 40 reading the original document 14 is provided in the main body 12 of the image reading apparatus 11. Each of a pair of reading portions 40 is provided on each side of the transport path 29 at a position between the transport roller pair 35 and the discharge roller pair 36 in the transport direction Y1. In the present embodiment, the pair of reading portions 40 include a first reading portion 40A that reads a front side (lower side) of the original document 14 transported along the transport path 29, and a second reading portion 40B that reads a rear side (upper side) of the original document 14 transported along the transport path 29, and are disposed at positions slightly deviated from each other in the transport direction Y1, but may be configured not to include one of the reading portions.

Each of the pair of reading portions 40 includes a light source 41 irradiating the original document 14 that is being transported with light by irradiating the reading region SA with the light, and an image sensor 42 reading an image from the original document 14. In a normal reading mode, only the first reading portion 40A performs a reading operation to read the front side of the original document 14, and, in a double-sided reading mode, both the first reading portion 40A and the second reading portion 40B perform a reading operation to read both sides (front and rear sides) of the original document 14.

The light source 41 includes, for example, an LED or a fluorescent lamp. The image sensor 42 receives reflected light that is light applied from the light source 41 and is reflected by the original document 14, converts the received light into an electric signal, and outputs a pixel signal having a value corresponding to an amount of the received light. In the above-described way, the image sensor 42 is a sensor that reads an image. The image sensor 42 is, for example, a linear image sensor. The image reading apparatus 11 can perform color scanning and monochrome scanning (grayscale scanning). In the following description, the light source 41 and the image sensor 42 of the first reading portion 40A side will be referred to as a first light source 41A and a first image sensor 42A, and the light source 41 and the image sensor 42 of the second reading portion 40B side will be referred to as a second light source 41B and a second image sensor 42B in some cases.

The image sensor 42 is, for example, a contact type image sensor in which a plurality of photoelectric conversion elements are arranged in a row along the main scanning direction X. Specifically, the image sensor 42 is a complementary metal oxide semiconductor (CMOS) image sensor. The image sensor 42 photoelectrically converts light received by each photoelectric conversion element and outputs a pixel signal having a value corresponding to an amount of the received light.

For example, when double-sided reading is performed, the front side of the original document 14 is read by the first image sensor 42A, and the rear side of the original document 14 is read by the second image sensor 42B. When single-sided reading is performed, the front side of the original document 14 is read by the first image sensor 42A. Each of the image sensors 42A and 42B has a reading region wider than the maximum original document size that can be read by the image reading apparatus 11. That is, each of the image sensors 42A and 42B forming the reading portions 40 has a reading range slightly longer than a width of the maximum size original document 14 in the main scanning direction X.

A color reference plate 43 is disposed at a position facing the image sensor 42 with the transport path 29 therebetween. The color reference plate 43 is disposed in the main scanning direction X over a region wider than the transport region of the original document 14 in a reading target range of the reading portion 40. Therefore, the color reference plate 43 also functions as a background plate that is read as the background of the original document 14. The color reference plate 43 is disposed over a range slightly wider than the width of the maximum size original document 14 in the main scanning direction X. That is, the color reference plate 43 is disposed in a range including at least a region facing the reading range of each of the image sensors 42A and 42B in the scanning direction. Therefore, each of the image sensors 42A and 42B reads the color reference plate 43 in a region where the original document 14 is not present.

The color reference plate 43 is a member for obtaining a white reference value for shading correction, and a white reference plate exhibiting white or a gray reference plate exhibiting gray is used. As a result, the color reference plate 43 is read as a white reference image, and a white reference value is generated based on the read white reference image. The gray reference plate is read as the background (gray background) of the original document and is used for detecting a position and a region of the original document 14. When a sensor for detecting the original document region is separately provided, the color reference plate 43 is preferably a white reference plate. The color reference plate 43 is not limited to a plate shape, and may have any shape and color as long as the color reference plate is a reference member for obtaining a white reference value used as a reference for luminance.

The image reading apparatus 11 includes the control portion 50. The control portion 50 controls the image reading apparatus 11 when the control portion 50 receives a job of reading an image from the original document 14 based on an operation signal from the operation portion 21 (refer to FIG. 1) operated by the user or a reading instruction signal (reading instruction) from a host apparatus 100 described later. When reading control is performed, the control portion 50 controls the feed motor 37, the transport motor 38, and the reading portions 40A and 40B, and processes image data based on images read from the original document 14 by the reading portions 40A and 40B.

Next, an electric configuration of the image reading apparatus 11 will be described with reference to FIG. 3.

Figure 3:
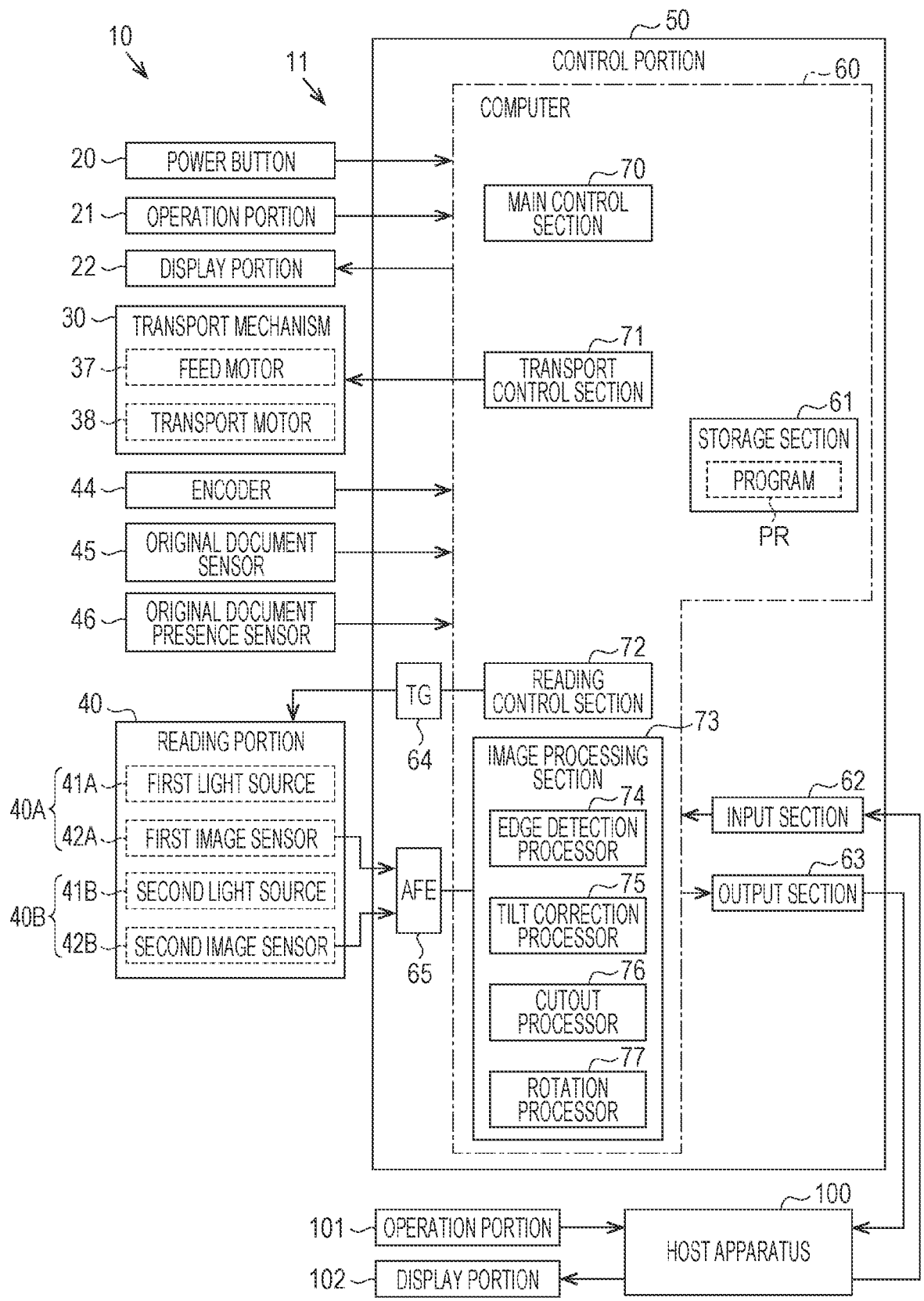
FIG. 3 is a block diagram illustrating an electric configuration of an image reading system.

As illustrated in FIG. 3, the image reading apparatus 11 is coupled to the host apparatus 100 through a communication cable. The host apparatus 100 is, for example, a personal computer (hereinafter, also referred to as a "PC"), and includes an operation portion 101 and a display portion 102 that are electrically coupled to a main body of the personal computer. The host apparatus 100 includes a scan driver (not illustrated) configured with software inside the host apparatus 100 by installing a scan driver program therein. The scan driver has a function of instructing the image reading apparatus 11 to read the original document 14. The scan driver transmits reading instruction information (scan job data) including reading condition information designated by a user operating the operation portion 101 of the host apparatus 100 and various commands, to the image reading apparatus 11. The scan driver receives image data including an image of the original document 14 read from the image reading apparatus 11 in response to the reading instruction information as a file with a format designated as one of the reading instruction information. The host apparatus 100 is not limited to a PC, but may be a personal digital assistant (PDA), a tablet PC, a smart device such as a smartphone, or the like.

When the operation portion 21 or the operation portion 101 of the host apparatus 100 is operated by the user, setting conditions related to an image reading process are set. That is, the setting conditions are set through the user's input operation. The setting conditions include reading conditions including an original document size, a reading resolution, a color mode, single-sided reading/double-sided reading, and storage conditions including a read data (image data) storage format, a forwarding method, and a storage destination. The original document size includes, for example, an A4 size and a B5 size, the reading resolution includes, for example, 300 dpi/600 dpi, and the color mode includes monochrome (gray scale)/color. The storage format includes a PDF format, a PDF/A format, a JPEG format, a GIF format, a TIFF format, and the like. The forwarding method includes forwarding to the host apparatus 100 and e-mail forwarding, and an address of the storage destination is designated in the storage destination.

The image reading apparatus 11 has the built-in control portion 50 that integrally controls the above operation. The control portion 50 includes a computer 60 configured with a microprocessor or the like. The computer 60 includes a storage section 61 (memory) configured with a RAM, a non-volatile memory, and the like. The storage section 61 stores a program PR or the like to be executed during reading control.

The control portion 50 is provided with an input section 62 including an input interface inputting various data and signals from the host apparatus 100 and an output section 63 including an output interface outputting read data that is read by the image reading apparatus 11 to the host apparatus 100.

The control portion 50 includes a timing generator 64 (hereinafter, also referred to as a "TG 64") that outputs pulse signals that define various operation timings including a read operation to the image sensors 42A and 42B. The control portion 50 includes an analog front end 65 (hereinafter, also referred to as an "AFE 65") that performs analog/digital conversion (A/D conversion) of pixel signals input from the image sensors 42A and 42B.

The storage section 61 stores the program PR including image processing routines illustrated in flowcharts of FIGS. 22 to 25. The storage section 61 stores setting condition information through the user's input operation on the operation portion 21. The computer 60 includes a main control section 70, a transport control section 71, a reading control section 72, and an image processing section 73 as functional constituents configured with software internally configured by executing the program PR. The main control section 70 integrally controls the image reading apparatus 11.

The transport control section 71 controls driving of the feed motor 37 and the transport motor 38 in response to instructions of the main control section 70. The feed roller 33 is rotated by driving the feed motor 37, and thus a plurality of original documents 14 set in the original document support 13 are fed into the main body 12 one by one in order from the lowest one. One driving roller 34A forming the feed roller pair 34 is rotationally driven by driving the feed motor 37, and the other separation roller 34B is rotationally driven by driving the transport motor 38. In particular, the transport control section 71 controls driving of the feed motor 37 and the transport motor 38 such that the original document 14 is transported at a reading speed corresponding to a reading resolution (for example, 300/600 dpi) in the reading region SA in the middle of the transport path 29. For example, when the reading resolution is relatively low (for example, 300 dpi), the original document 14 is transported at a high speed, and, when the reading resolution is relatively high (for example, 600 dpi), the original document 14 is transported at a low speed.

The reading control section 72 controls the reading portion 40 via the TG 64, and causes the reading portion 40 to read an image of the original document 14. In particular, the reading control section 72 outputs pulse signals that defines operation timings of various operations including a reading operation on the image sensor 42, to the TG 64, and controls light emission of the light source 41 via a light source driving section (not illustrated) such that the reading region SA is irradiated with light from the light source 41.

When a digital signal corresponding to an image read by the reading portion 40 is input via the AFE 65, the image processing section 73 temporarily stores image data based on the input digital signal, and performs a well-known correction process such as shading correction on the stored image data to generate image data of the original document 14. The image processing section 73 performs various corrections such as gamma correction in addition to the shading correction to generate corrected image data. In addition, the image processing section 73 performs a format conversion process of converting image data into a file with a designated format. Examples of a designable format include a JPEG format, a PDF format, and a TIF format. The image processing section 73 transmits the file generated through conversion into the designated format to a designated transmission destination via the output section 63. In the image reading apparatus 11, transmission destinations that is designable by the user include, for example, the host apparatus 100 coupled thereto via a communication cable (not illustrated), a server apparatus (not illustrated) coupled thereto via a network such as the Internet, and a terminal apparatus designated by an e-mail address when the file is attached to an e-mail. The server apparatus includes a cloud server apparatus.

The image processing section 73 of the present embodiment performs a predetermined detection process and predetermined image processing on read data during generation of the file with the designated format from the read data, and thus generates image data of the original document before being converted into the designated format.

Figure 4:
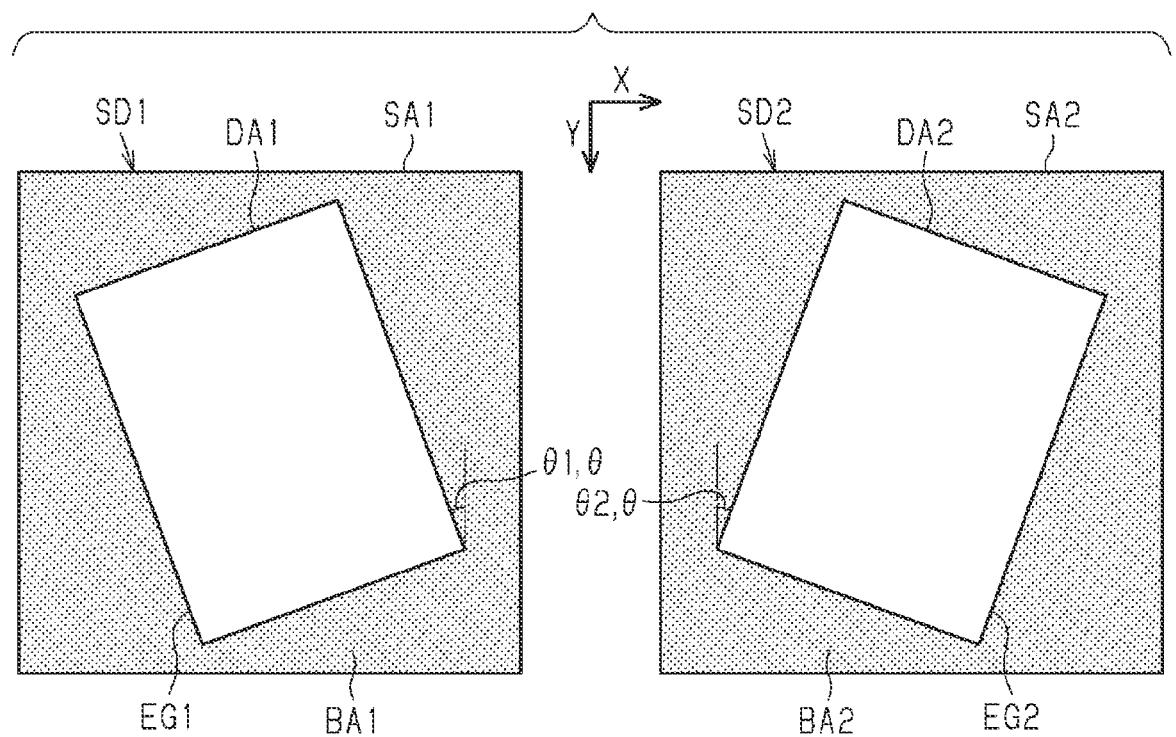
FIG. 4 is a schematic diagram illustrating read data of a front side and read data of a rear side of an original document.

The image processing section 73 of the present embodiment performs the predetermined detection process and the predetermined image processing on first read data SD1 obtained by the first reading portion 40A reading a front side P1 of the original document 14 and second read data SD2 obtained by the second reading portion 40B reading a rear side P2 of the original document 14 (refer to FIG. 4). The image processing section 73 performs an edge detection process and a character detection process as the predetermined detection process. The image processing section 73 performs a tilt correction process, a cutout process, and a rotation process as the predetermined image processing. Hereinafter, the first read data SD1 will also be referred to as read data SD1 of the front side, and the second read data SD2 will also be referred to as read data SD2 of the rear side.

As illustrated in FIG. 3, the image processing section 73 includes an edge detection processor 74, a tilt correction processor 75, a cutout processor 76, and a rotation processor 77.

As illustrated in FIG. 4, the edge detection processor 74 performs an edge detection process of detecting an edge EG1 of an original document region DA1 that is a region of the original document in the read data SD1 of the front side, and an edge EG2 of an original document region DA2 that is a region of the original document in the read data SD2 of the rear side.

The edge detection processor 74 analyzes the RGB format read data SD1 and SD2, and thus analyzes tilt angles at which the original document regions DA1 and DA2 are tilted in the read data SD1 and SD2 read by the image sensors 42A and 42B of the reading portions 40A and 40B. In particular, the edge detection processor 74 discriminates the original document regions DA1 and DA2 from the background regions BA1 and BA2 outside the original document regions DA1 and DA2 that are read from images of the color reference plate 43, based on the RGB format read data, and detects the original document regions DA1 and DA2 based on the discrimination result.

The tilt correction processor 75 performs a tilt correction process of correcting the tilt of the original document region DA. Specifically, the tilt correction processor 75 detects a tilt angle θ of the original document region DA1 with respect to the first read data SD1, and performs a tilt correction process of tilting the original document region DA1 in a direction of eliminating a skew of the tilt angle θ. The tilt correction processor 75 detects the tilt angle θ of the original document region DA2 with respect to the second read data SD2, and performs a tilt correction process of tilting the original document region DA2 in a direction of eliminating a skew of the tilt angle θ.

In particular, the tilt correction processor 75 analyzes the read data SD1 and SD2 obtained by reading both sides of the original document 14 in the reading portions 40A and 40B, respectively, and detects the tilt angles θ at which the original document regions DA1 and DA2 in the read data SD1 and SD2 are tilted in the sub-scanning direction Y. Then, the tilt correction processor 75 acquires analysis results such as tilt angles θ and −θ of the original document regions DA1 and DA2. The tilt correction processor 75 performs a tilt correction process of rotating the original document regions DA1 and DA2 by an angle −θ at which the tilt angles θ of the original document regions DA1 and DA2 become 0°. The tilt correction processor 75 may be configured by, for example, an ASIC included in the computer 60, or may be configured by a CPU that executes a tilt correction process program.

Here, the front side P1 of the original document is referred to as a "first side P1", and the rear side P2 of the original document is referred to as a "second side P2". The tilt correction processor 75 performs the following process. When the edge detection process for the first side is successful, the tilt correction processor 75 performs a tilt correction process of tilting the original document region DA1 of the first side at a tilt angle specified based on the edge detection result of the first side. When the edge detection process for the second side is successful, the tilt correction processor 75 performs a tilt correction process of tilting the original document region DA2 of the second side at a tilt angle specified based on the edge detection result of the second side.

When an edge cannot be detected on a side through the edge detection process and detection of the original document region DA fails, the original document region DA of the side for which the detection fails is specified based on a detection result of an edge for a side for which detection is successful using a relationship between positions or tilts of the front side and the rear side of the original document. Therefore, a tilt correction process on the original document region DA of the failure side becomes possible.

That is, when the edge detection process for the first side fails and the edge detection process for the second side is successful, the tilt correction processor 75 performs a tilt correction process of tilting the original document region DA1 of the first side specified based on the edge detection result of the second side for which detection is successful, at the tilt angle specified similarly. That is, when the edge detection process for the first side is successful and the edge detection process for the second side fails, the tilt correction processor 75 performs a tilt correction process of tilting the original document region DA2 of the second side specified based on the edge detection result of the first side for which detection is successful, at the tilt angle specified similarly.

The cutout processor 76 performs a cutout process of cutting out the original document region DA from the read data SD. The cutout processor 76 generates image data GD of the original document through the cutout process. Specifically, the cutout processor 76 performs a cutout process of cutting out the original document region DA1 from the first read data SD1 of the front side to generate image data GD1 of the original document front side, and a cutout process of cutting out the original document region DA2 from the second read data SD2 of the rear side to generate image data GD2 of the original document rear side.

Here, the front side P1 of the original document is referred to as a "first side P1", and the rear side P2 of the original document is referred to as a "second side P2". The cutout processor 76 performs the following process. When the edge detection process for the first side is successful, the cutout processor 76 performs a cutout process of cutting out the original document region DA1 of the first side to generate image data of the first side. When the edge detection process for the second side is successful, the cutout processor 76 performs a cutout process of cutting out the original document region DA2 of the second side to generate image data of the second side.

When the edge detection process for the first side fails and the edge detection process for the second side is successful, the cutout processor 76 performs a cutout process of the original document region DA1 specified based on the edge detection result of the second side for which detection is successful from the first read data SD1 to generate the image data GD1 of the first side. When the edge detection process for the first side is successful and the edge detection process for the second side fails, the cutout processor 76 performs a cutout process of cutting out the original document region DA2 of the second side specified based on the edge detection result of the first side for which detection is successful from the second read data SD2 to generate the image data GD2 of the second side.

The rotation processor 77 performs a rotation process of rotating the image data GD in order to align an orientation of the image data GD of the original document. Specifically, the rotation processor 77 determines a rotation angle for aligning an orientation of the image data GD1 of the original document front side, and performs a rotation process to rotate the image data GD1 of the front side by the determined rotation angle. The rotation processor 77 determines a rotation angle for aligning an orientation of the image data GD2 of the original document rear side, and performs a rotation process of rotating the image data GD2 of the rear side by the determined rotation angle.

In particular, the rotation processor 77 determines the rotation angles for rotating the image data GD1 and GD2 based on a character detection result of detecting orientations of characters included in the image data GD1 and GD2. The rotation processor 77 of the present embodiment acquires binding position information that is information indicating a binding position of the original document. There are two methods of acquiring the binding position information. One is a method of detecting a binding mark at a binding position from an image, and the other is a method in which a user gives the binding position information to the control portion 50 of the image reading apparatus 11 by operating the operation portions 21 and 101. When the former method is used, the rotation processor 77 performs a binding position detection process. When the latter method is used, one option is selected, for example, from among a plurality of binding method options including "horizontal binding" (refer to FIGS. 8 and 9) and "upper binding" (refer to FIGS. 10 and 11).

The image processing section 73 is configured as a functional constituent generally configured with software in the control portion 50 by the computer 60 executing the program PR stored in the storage section 61 and illustrated in the flowcharts of FIGS. 22 to 25. The image processing section 73 includes the edge detection processor 74, the tilt correction processor 75, the cutout processor 76, and the rotation processor 77 generally configured with software. Some of the edge detection processor 74, the tilt correction processor 75, and the cutout processor 76 may be hardware configured with an electronic circuit such as an ASIC.

Figure 22:
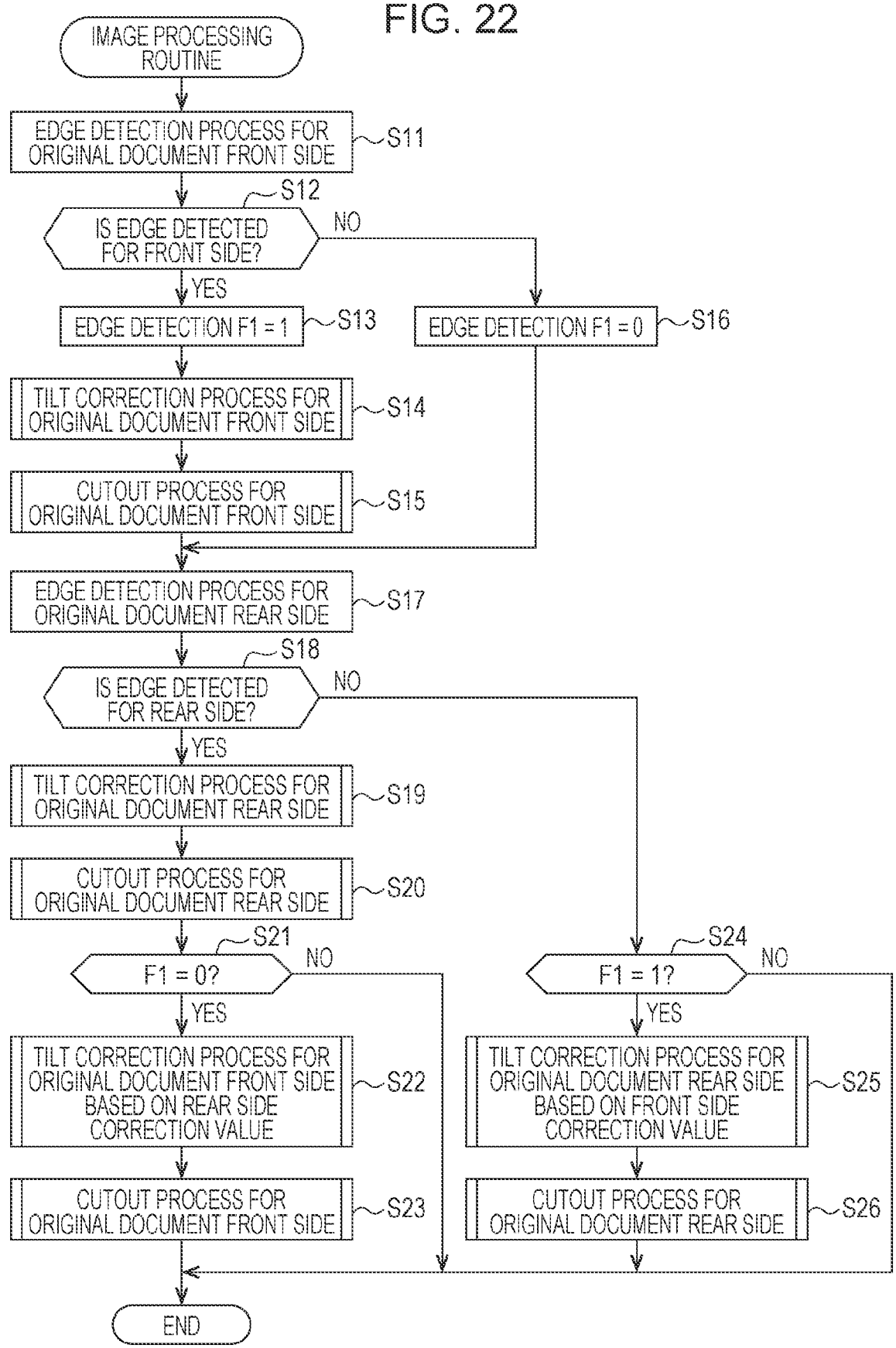
FIG. 22 is a flowchart illustrating a first image processing routine.
Figure 23:
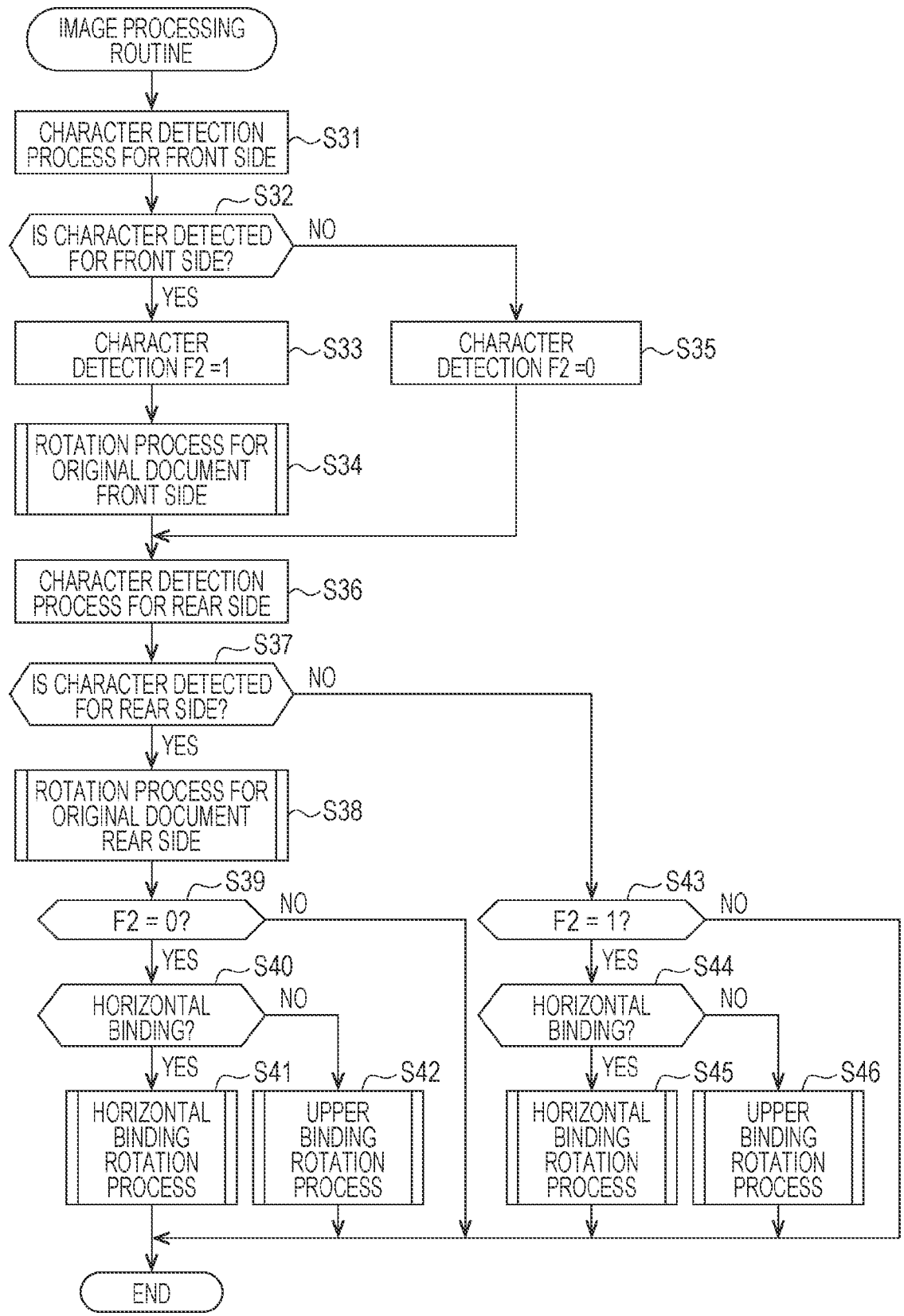
FIG. 23 is a flowchart illustrating a second image processing routine.
Figure 24:
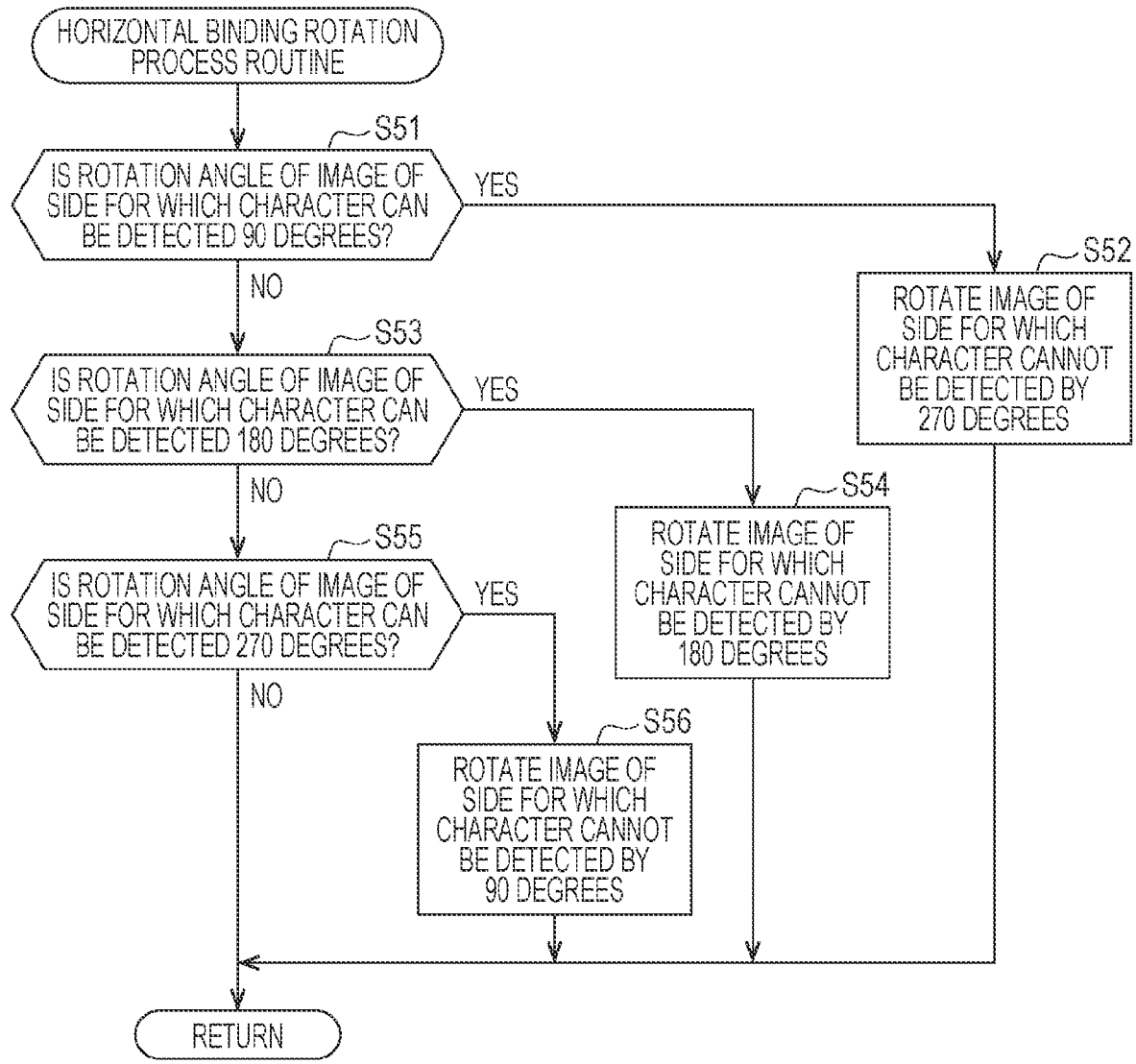
FIG. 24 is a flowchart illustrating a horizontal binding rotation process routine.
Figure 25:
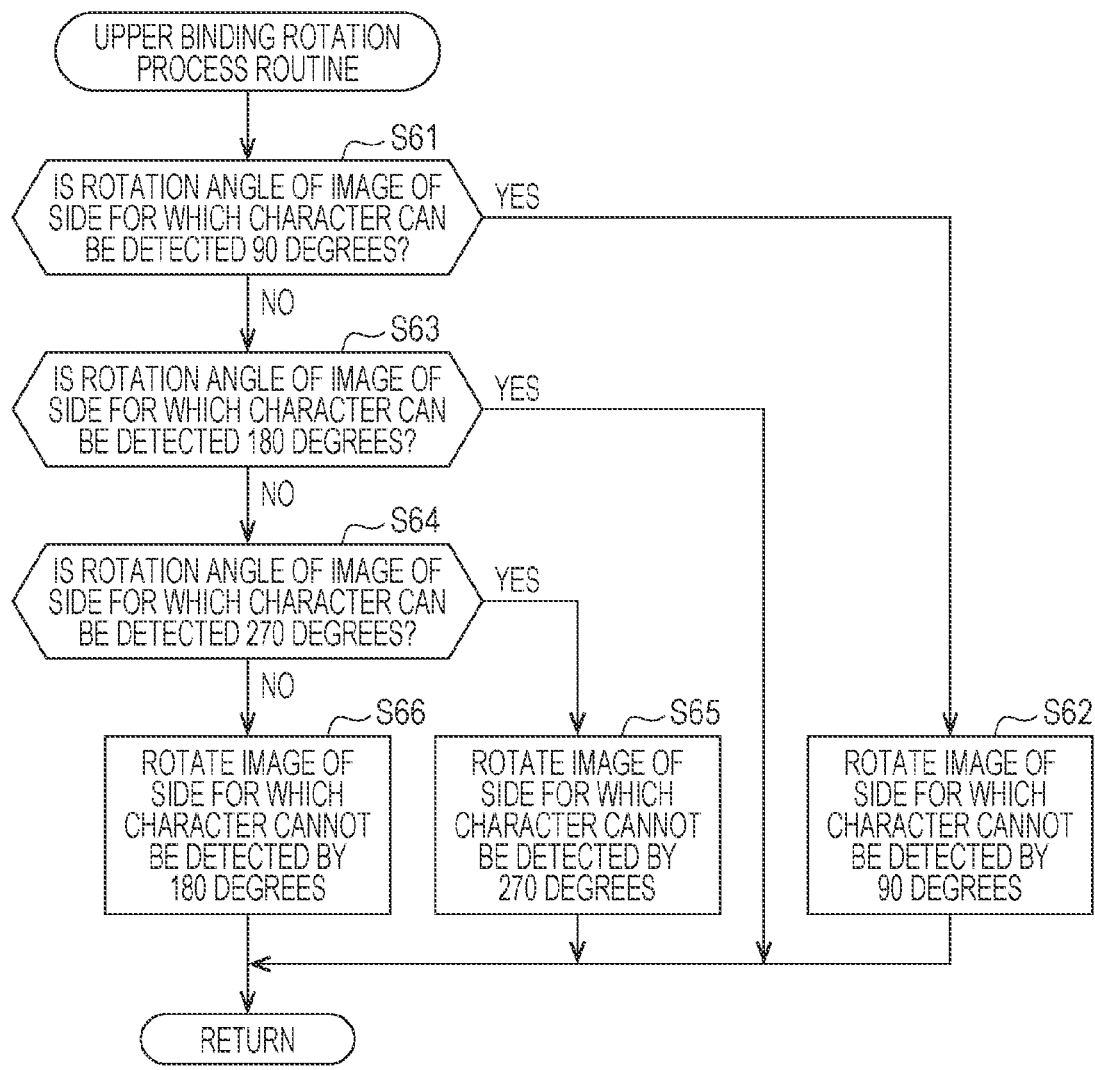
FIG. 25 is a flowchart illustrating an upper binding rotation process routine.

In the present embodiment, the image processing section 73 performs first image processing illustrated in the flowchart of FIG. 22 and second image processing illustrated in the flowcharts of FIGS. 23 to 25. The edge detection processor 74, the tilt correction processor 75, and the cutout processor 76 are started when the image processing section 73 performs the first image processing. The image data GD1 of the original document front side and the image data GD2 of the original document rear side are generated through the first image processing.

The rotation processor 77 is started when the image processing section 73 performs the second image processing. The image processing section 73 performs a rotation process of rotating the image data GD1 of the original document front side and the image data GD2 of the original document rear side by a predetermined rotation angle in order to align the image data GD1 and GD2 in an appropriate orientation based on orientations of characters detected through a character detection process. When a character detection fails on a side for which characters cannot be detected through the character detection process, a rotation angle required for a rotation process of rotating image data of the character detection failure side is determined based on a character detection result of a character detection successful side and binding position information.

Here, one of the front side P1 and the rear side P2 of the original document will be referred to as a first side, and a side opposite to the first side will be referred to as a second side. For example, the front side P1 will be referred to as a "first side P1", and the rear side P2 of the original document will be referred to as a "second side P2". The rotation processor 77 performs the following process. When a character detection process on an image of the first side is successful, the rotation processor 77 performs a rotation process of rotating the image data GD1 of the first side by a rotation angle that is specified based on an orientation of a character specified from a character detection result of the first side. When a character detection process on an image of the second side is successful, the rotation processor 77 performs a rotation process of rotating the image data GD2 of the second side by a rotation angle that is specified based on an orientation of a character specified from a character detection result of the second side.

When a character detection process on an image of the first side fails and a character detection process on an image of the second side is successful, the rotation processor 77 performs a rotation process of rotating the image data GD1 of the first side by a rotation angle that is specified based on a character detection result of the image of the second side for which detection is successful and binding position information. When a character detection process on an image of the first side is successful and a character detection process on an image of the second side fails, the rotation processor 77 performs a rotation process of rotating the image data GD2 of the second side by a rotation angle that is specified based on a character detection result of the image of the first side for which detection is successful and binding position information.

The image processing section 73 converts the image data GD1 and GD2 subjected to the rotation process, into a file with a format designated by the user. The image processing section 73 converts the image data GD1 and GD2 subjected to the rotation process into a file with a format corresponding to format designation information in the reading condition information. As the format designation information, any one of a plurality of prepared formats such as a JPEG format, a PDF format, and a GIF format is designated. The image processing section 73 transmits the file with the designated format to a designated transmission destination via the output section 63. The image processing section 73 transmits the image data GD1 and GD2 converted into the file with the designated format to, for example, the host apparatus 100.

FIG. 4 illustrates the read data SD1 of the front side obtained by the first image sensor 42A reading the front side P1 (refer to FIG. 12) of the original document 14, and the read data SD2 of the rear side obtained by the second image sensor 42B reading the rear side P2 (refer to FIG. 12) of the original document 14. FIG. 4 illustrates an example of the read data SD1 and SD2 that is read in a state in which the original document 14 is skewed. In the present embodiment, the front side P1 of the original document 14 corresponds to the first side, and the rear side P2 of the original document 14 corresponds to the second side.

The image sensors 42A and 42B start reading at a timing slightly before the leading end of the original document 14 reaches the reading positions of the image sensors 42A and 42B, and finishes the reading at a timing slightly after the trailing end of the original document 14 passes through the reading position. Therefore, as illustrated in FIG. 4, the read data SD1 of the front side is data including the original document region DA1 in the rectangular reading region SA1. The read data SD2 of the rear side is data including the original document region DA2 in the rectangular reading region SA2. When the front side and the rear side of the original document 14 are not particularly differentiated from each other, the read data, the reading region, and the original document region are referred to as simply as the read data SD, the reading region SA, and the original document region DA.

First, the edge EG1 (side) of the original document region DA1 is detected in the read data SD1. That is, the background region BA1 other than the original document region DA1 of the read data SD1 is an image portion obtained by reading the color reference plate 43. The color reference plate 43 exhibits an achromatic color different from a color of the medium itself of the original document 14. Specifically, the color reference plate 43 exhibits gray. Thus, a boundary line based on a color difference or a density difference appears between the medium (for example, paper), that is normally white, of the original document 14 and the color reference plate 43. The edge detection processor 74 detects the boundary line between the original document region DA1 and the background region BA1 based on the color difference or the density difference. The side of the original document region DA1 is recognized from the boundary line. The original document region DA1 is specified by specifying four sides of the original document region DA1. Similarly, the original document region DA2 is specified by detecting the edge EG2 (side) of the original document region DA2 in the read data SD2 of the rear side. When the original document regions DA1 and DA2 are specified, position coordinates, sizes, and tilt angles θ of the original document regions DA1 and DA2 are obtained. The tilt angles θ are calculated as tilt angles θ of the original document regions DA1 and DA2 with respect to the sub-scanning direction Y.

Here, as illustrated in FIG. 4, it is assumed that the tilt angle θ of the original document region DA1 in the first read data SD1 is θ1 and the tilt angle θ of the original document region DA2 in the second read data SD2 is θ2. There is a relationship of θ1=−θ2 between the tilt angle θ1 of the original document region DA1 of the front side and the tilt angle θ2 of the original document region DA2 of the rear side.

Here, when a density of the characters or pictures printed on the original document 14 is low, the reading portions 40A and 40B perform a process of automatically increasing a reading density. Thus, when the characters or pictures on the original document 14 are thin and the original document 14 has wrinkles, the wrinkles are read deeply. In this case, when the wrinkles of the read original document 14 are present to intersect the rectangular sides of the original document 14, the edge detection processor 74 cannot differentiate the boundary line of the original document region DA1 from the wrinkles. As a result, when the original document 14 has many wrinkles, the edge detection processor 74 cannot correctly detect the edges due to the wrinkles, and cannot specify the original document region DA. When the original document region DA is not specified, the position coordinates and the tilt angle θ of the original document region DA cannot be calculated. Therefore, a tilt correction error, a cutout error, and a rotation process error occur.

The tilt correction process, the cutout process, and the rotation process are separately performed on the front side and the rear side of the original document 14. In the present embodiment, when the original document region DA of one of the front side and the rear side of the original document 14 cannot be specified, the position coordinates and the tilt angle θ of the original document region DA of a side of which the original document region DA cannot be specified are specified based on an edge detection result of a side of which the original document region DA can be specified of the front side and the rear side, and a tilt correction process and a cutout process for the original document region DA of the side of which the original document region DA cannot be specified are performed.

Here, the position coordinates and the tilt angle θ of the original document region DA correspond to examples of image processing variables necessary for performing predetermined image processing such as the tilt correction process. When an edge detection process for one side fails, the position coordinates and the tilt angle θ of the original document region DA with respect to an image of the failure side are specified based on values of the position coordinates and the tilt angle θ of the original document region DA specified from an edge detection process result of an image of the other side for which an edge can be detected. The position coordinates of the original document region DA correspond to an example of image processing variables necessary for performing a predetermined image processing such as a cutout process. When an edge detection process for one side fails, a cutout process is performed based on values of position coordinates of the original document region DA of an image of one side, based on values of the position coordinates of the original document region DA specified from an edge detection process result of an image of the other side for which the edge can be detected. The edge detection process performed to acquire the tilt angle θ corresponds to an example of a tilt angle detection process. The edge detection process performed to acquire the original document region corresponds to an example of a region detection process.

Figure 5:
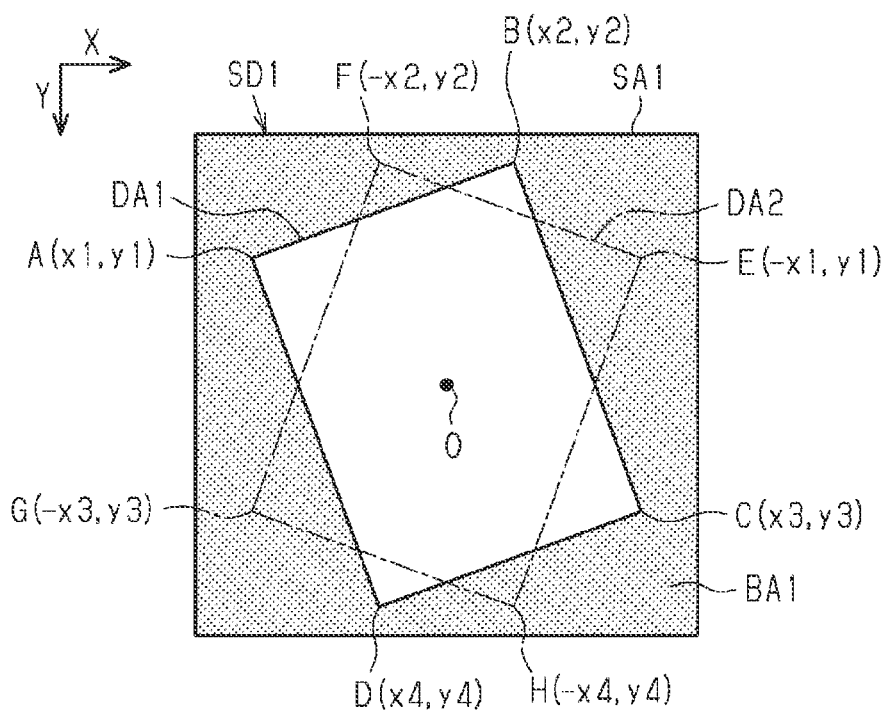
FIG. 5 is a schematic diagram illustrating a relationship between original document regions of the front side and the rear side in the read data.

As illustrated in FIG. 5, when an edge detection process for the front side is successful and an edge detection process for the rear side fails, position coordinates in the sub-scanning direction Y are the same, and an x coordinate value of a vertex at a position that is linearly symmetric thereto with respect to a line parallel to the sub-scanning direction Y passing through the center O of the original document region DA1 is calculated. This calculation is performed on four vertices.

Here, assuming that the center of the original document region DA1 is the origin on the coordinates, the following relationship is established. Assuming that coordinates of the four vertices A, B, C, and D of the original document region DA1 corresponding to one side of the original document are (x1,y1), (x2,y2), (x3,y3), and (x4,y4), coordinates of four vertices E, F, G, and H of the original document region DA2 of the other side (for example, the rear side) of the original document are (−x1,y1), (−x2,y2), (−x3,y3), and (−x4,y4). Therefore, when an edge can be detected for one side, even though an edge cannot be detected for the other side, the coordinate values of the four vertices of the original document region DA2 of the other side can be specified from the coordinate values of the four vertices of the original document region DA1 of one side, and thus the original document region DA2 of the other side can be specified from the coordinate values of the four vertices. The tilt angle θ1 is −θ2. In the above-described way, the coordinate values of the four vertices and the tilt angle θ of the original document region DA of the other side for which the edge cannot be detected are specified. Thus, the tilt correction process and the cutout process for the original document region DA can be performed on the other side for which edge detection has failed. For convenience of description, the center O of the original document region DA1 is assumed to be the origin, but the coordinate values of the four vertices can be calculated regardless of a set position of the origin. The process of calculating the position coordinate values of the original document region DA of the other side based on the position coordinate values of the original document region DA of one side illustrated in FIG. 5 corresponds to a process of specifying a value of an image processing variable for an image of one side (the rear side in the example illustrated in FIG. 5) for which detection fails based on a value of an image processing variable specified from a detection result of an image of the other side (the front side in the example illustrated in FIG. 5) for which detection is successful.

Figure 6:
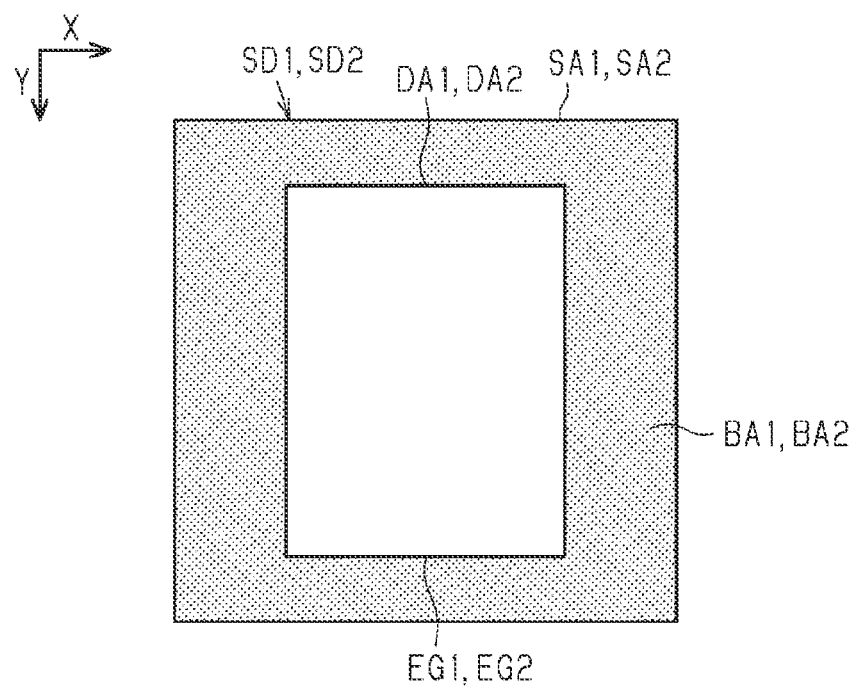
FIG. 6 is a schematic diagram for explaining a tilt correction process for an original document region.

As illustrated in FIG. 6, as a result of performing the tilt correction process on the read data SD1 and SD2, the original document regions DA1 and DA2 are corrected in the orientation without skew. The original document regions DA1 and DA2 are cut out from the read data SD1 and SD2 illustrated in FIG. 6 by the cutout processor 76, and thus the image data GD1 and GD2 is generated. As illustrated in FIGS. 8 to 11, the image data GD1 and GD2 include characters or character strings forming a sentence or the like written in the original document. The rotation processor 77 performs a rotation process of rotating the image data GD1 and GD2 of the original document in order to align orientations of the characters included in the original document region DA. Thus, the rotation processor 77 performs a character detection process of detecting characters in the image data GD1 and GD2.

Character Detection Process

The rotation processor 77 performs a character detection process of detecting characters as a predetermined detection process. As predetermined image processing, the rotation processor 77 determines a rotation angle for rotating the image data GD1 and GD2 based on a character detection result, and performs a rotation process of rotating the image data GD1 and GD2 by the determined rotation angle. When the character detection process fails, a rotation angle for rotating an image of a failure side cannot be specified. Thus, a rotation angle for rotating the image of one side for which character detection fails is specified based on a rotation angle that is specified from a value indicating an orientation of a character specified from a detection result of the other side for which character detection is successful and binding position information. The rotation processor 77 performs a rotation process of rotating the image of the side for which the character detection fails by the specified rotation angle. This rotation angle corresponds to an example of an image processing variable necessary for performing predetermined image processing such as a rotation process of rotating image data.

Specifically, the storage section 61 stores a registered character in advance. The registered character is, for example, a character in which, even when the character is inverted upside down, the inversion can be identified, among numbers and alphabets. That is, a character of which an upper half and a lower half are not in a linear symmetric relationship and a right half and a left half are not in a linear symmetric relationship is registered as the registered character.

When the character detection process is performed, the rotation processor 77 detects a character that matches the registered character from a character string read from the original document 14. The rotation processor 77 detects the registered character through, for example, a pattern matching process. When the registered character is detected, an orientation of the detected registered character is then determined. Orientations of the original document regions DA1 and DA2 are aligned such that orientations of the characters are aligned. That is, the rotation processor 77 performs a rotation process of aligning the orientations of the characters on the cut-out original document regions DA1 and DA2.

Figure 8:
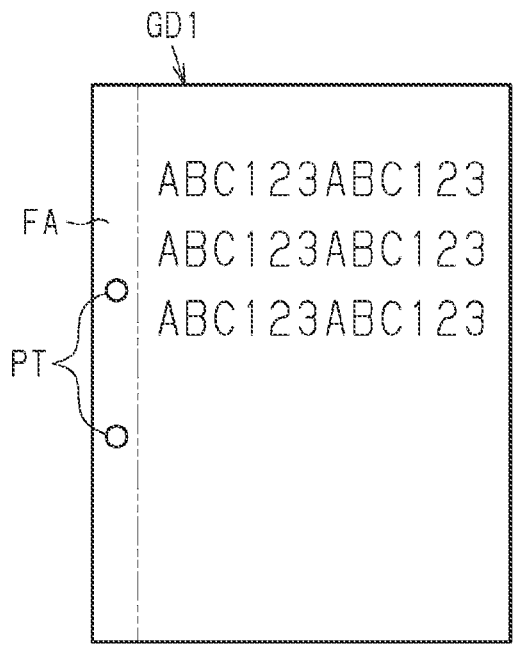
FIG. 8 is a schematic diagram illustrating image data of a front side of a horizontally bound original document.
Figure 9:
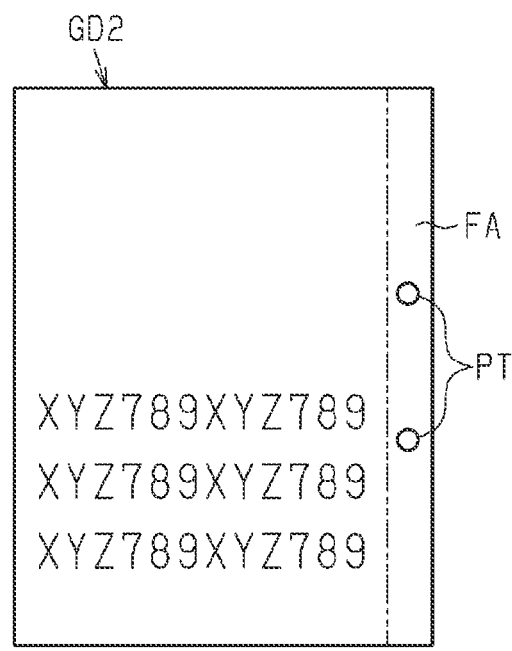
FIG. 9 is a schematic diagram illustrating image data of a rear side of the horizontally bound original document.

FIG. 8 illustrates the image data GD1 obtained by reading the front side of the original document 14, and FIG. 9 illustrates the image data GD2 obtained by reading the rear side of the original document 14. As illustrated in FIGS. 8 and 9, characters are written in the image data GD1 and GD2 of the original document. In the examples illustrated in FIGS. 8 and 9, alphabets and numbers are written as the characters. The rotation processor 77 performs a character detection process of detecting a registered character from among the characters in the original document. When the registered character is detected, the rotation processor 77 detects an orientation of the detected registered character.

Here, the rotation processor 77 configured by the computer 60 handles an orientation of the character as, for example, a 2-bit numerical value. For example, as the orientation of the character, four orientations are defined every 90 degrees, and are respectively indicated by values of "00", "01", "10", and "11". Therefore, a value of an image processing variable specified from a detection result in the character detection process is indicated by a 2-bit value in this example.

Binding Position Detection Process

The rotation processor 77 of the present embodiment performs a binding position detection process of detecting a binding position on the image data GD1 and GD2 of the original document. The binding position detection process is a process of detecting a binding position of the original document 14 from the image data GD1 and GD2. A binding method according to a difference in a binding position of the original document 14 includes "horizontal binding" illustrated in FIGS. 8 and 9 and "upper binding" illustrated in FIGS. 10 and 11.

For example, when printing is performed by a printing apparatus (not illustrated) according to a designated binding method, a binding margin region FA indicated by a two-dot chain line in FIGS. 8 and 9 is set at a designated edge of the original document, and a character string such as a sentence or a picture is printed in a region other than the binding margin region FA. The user binds the original documents 14 at the binding margin region FA using a binding device such as a puncher or a stapler.

Examples of binding methods include a method of punching holes in a binding margin of the original document 14 and binding a plurality of original documents 14 with a binder or the like, and a method of stacking a plurality of original documents 14 in a state in which binding margins are aligned and binding the original documents 14 with a stapler. A plurality of original documents 14 bound in this way may be scanned. In this case, the plurality of original documents 14 may have punch holes in the binding margin or have staple marks of a stapler.

A read image obtained by reading the original document 14 may include staple marks of a stapler or punch holes in an identifiable manner. In the examples illustrated in FIGS. 8 and 9, in the binding margin region FA of the image data GD1 and GD2 of the original document, there are binding marks such as punch holes as targets for detecting a binding position. The rotation processor 77 performs a binding position detection process of detecting a binding position in the image data GD1 and GD2 of the original document by detecting punch holes or staple marks on an image based on the image data GD1 and GD2 of the original document. In the above-described way, the rotation processor 77 of the present embodiment performs the character detection process and the binding position detection process. Instead of the binding position detection process or in addition to the binding position detection process, the user may input information regarding a binding position to the control portion 50 of the image reading apparatus 11 or the host apparatus 100 by operating the operation portion 21 of the image reading apparatus 11 or the operation portion 101 of the host apparatus 100. Regarding designation of the binding position, for example, it is designated whether a plurality of original documents to be scanned are subjected to "horizontal binding" or "upper binding" from a selection field, displayed on the display portions 22 and 102, in which "horizontal binding" and "upper binding" are selectable. The image processing section 73 configured by the computer 60 performs the binding position detection process or inputs binding position information. In this example, as the binding position information, there are two pieces of information such as "horizontal binding" and "upper binding", which are represented by, for example, 1-bit values "0" and "1".

FIGS. 8 and 9 illustrate images obtained by reading both sides of a horizontally bound original document. FIG. 8 illustrates an image of the original document front side, and FIG. 9 illustrates an image of the original document rear side. In the horizontal binding method illustrated in FIGS. 8 and 9, an orientation of a character is parallel to a long side of the original document, an upper part of the character is directed toward one short side, and a direction of a character string (writing direction) is parallel to a short side of the original document. The binding margin region FA is secured at a side edge along one long side of the original document. The binding margin of the original document front side and the binding margin of the original document rear side are located on opposite sides in regions other than the binding margins, that is, regions where the character string or the like is disposed. In other words, as illustrated in FIGS. 8 and 9, in the "horizontal binding", when the original document is disposed in an orientation in which the characters are readable, the binding margins are located on the left or right side of the regions where the characters are disposed, and positions of the binding margins are laterally opposite to each other on the front side and the rear side of the original document.

Figure 10:
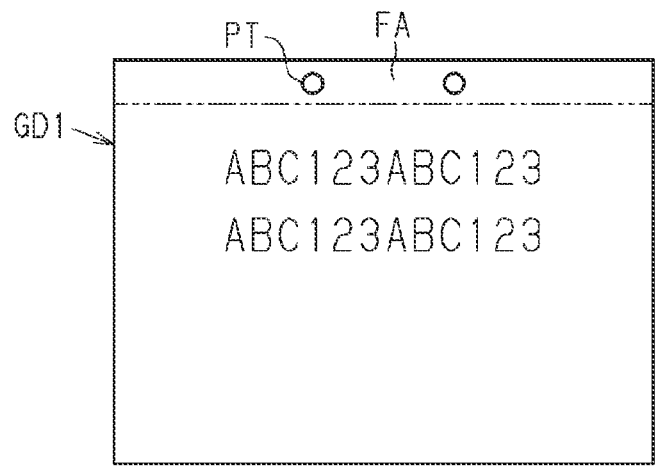
FIG. 10 is a schematic diagram illustrating image data of a front side of an upper bound original document.
Figure 11:
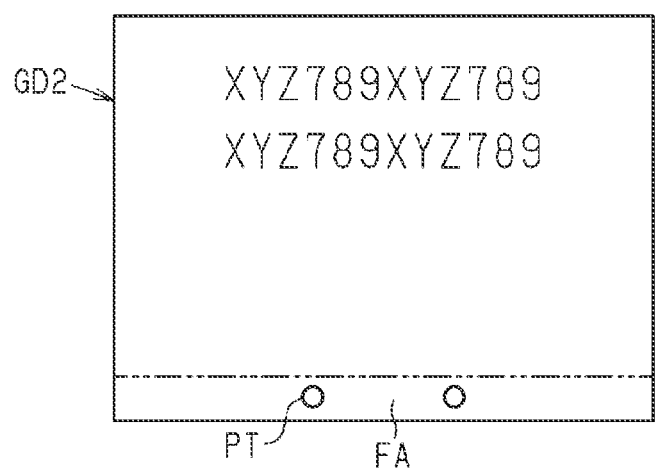
FIG. 11 is a schematic diagram illustrating image data of a rear side of the upper bound original document.

In the upper binding method illustrated in FIGS. 10 and 11, an orientation of a character is parallel to the short side of the original document, an upper part of the character is directed toward one long side, and a direction of a character string is parallel to the long side of the original document. The binding margin region FA is secured at a side edge along one long side of the original document. The binding margin of the original document front side and the binding margin of the original document rear side are located on opposite sides in the regions where the character string or the like is disposed. In other words, as illustrated in FIGS. 10 and 11, in the "upper binding", when the original document is disposed in an orientation in which the characters are readable, the binding margin is located above or below the characters. The orientations of the characters refer to orientations in which the characters are readable, and orientations in which the upper parts of the characters are on upper sides.

Next, an operation of the image reading apparatus 11 will be described.

The user sets reading conditions in the image reading apparatus 11 by operating the operation portion 21 of the image reading apparatus 11 or the operation portion 101 of the host apparatus 100. Specifically, the user sets the original document 14 on the platen 13A of the original document support 13 of the image reading apparatus 11, and then operates the operation portions 21 and 101 to select the reading conditions including a reading resolution (600 dpi/300 dpi), a color mode (color/grayscale), and a reading method (single-sided reading/double-sided reading). In this case, the user who desires double-sided reading of the original document 14 designates the double-sided reading. The user operates the operation portions 21 and 101 to give an instruction for execution of scanning. The scanning instruction includes reading condition information. When the reading instruction is received, the image reading apparatus 11 starts reading the set original document.

The transport control section 71 of the control portion 50 controls driving of the motors 37 and 38 that are drive sources of the transport mechanism 30, and thus the original documents 14 set on the platen 13A are fed one by one in order from the lowest one.

In the image reading apparatus 11, the reading portion 40 reads the original document that is being transported at a reading position. Specifically, during the double-sided reading, the first image sensor 42A reads the front side P1 of the original document 14, and the second image sensor 42B reads the rear side P2 of the original document 14. In this case, each of the image sensors 42A and 42B reads the original document 14 and the color reference plate 43 as the background thereof.

Reading signals output from the image sensors 42A and 42B are input to the image processing section 73 as read data via the AFE 65. That is, as illustrated in FIG. 4, the read data SD includes the original document region DA and the background region BA in the rectangular reading region SA. For example, when a skew occurs in a case where an original document is transported, the original document is tilted with respect to the transport direction Y1 as illustrated in FIG. 4. Therefore, each of the image sensors 42A and 42B reads the tilted original document. As a result, the original document region DA is tilted at a predetermined angle in the reading region SA of the read data SD.

Meanwhile, when the original document has wrinkles or a background color of the original document is similar to a color of the color reference plate, an edge that is a boundary between the original document region DA and the background region BA cannot be detected in the read data SD in some cases. When the edge cannot be detected, the tilt correction process, the cutout process, and the rotation process cannot be performed in the related art. In the present embodiment, even though an edge for one side of both sides of the original document is not detected during double-sided reading, when an edge is detected for the opposite side, the tilt correction process and the cutout process for that side are performed based on a tilt correction value of the side for which the edge can be detected.

In the present embodiment, the character detection process is performed as a predetermined detection process. For a side for which a character is not detected through the character detection process, when the character can be detected for an opposite side, an orientation of the character for the side for the character cannot be detected is estimated based on a detection result of the side for which the character can be detected, and a rotation process is performed according to the estimated character orientation.

In this case, in the present embodiment, information regarding an original document binding method is used. There are generally "horizontal binding" and "upper binding" as the original document binding method. As a predetermined detection process, the binding position detection process is performed. For a side for which a binding mark is not detected through the binding position detection process, when the binding mark can be detected for an opposite side, a binding method for the side for which the binding mark cannot be detected is estimated based on a detection result of the side for which the binding mark can be detected, and a rotation process is performed according to the estimated binding method.

Next, the first image processing routine will be described with reference to FIG. 22. This first image processing routine is performed by the computer 60 of the control portion 50 executing the program PR when a scanning instruction is received from the host apparatus operated by the user. After the original document 14 is set on the platen 13A of the original document support 13 of the image reading apparatus 11, the user operates the operation portion 101 such as a mouse of the host apparatus 100 to select reading conditions including a reading resolution (600 dpi/

300 dpi), a color mode (color/grayscale), and a reading method (single-sided reading/double-sided reading), and then gives an instruction for execution of scanning. When the instruction for execution of scanning is received, the control portion 50 (computer 60) executes the first image processing routine illustrated in FIG. 22.

The control portion 50 causes the computer 60 to execute the first image processing routine. In the first image processing, the edge detection processor 74, the tilt correction processor 75, and the cutout processor 76, which are software configured by the computer 60 executing the program, are started at predetermined timings. The first image processing includes an edge detection process as a predetermined detection process, and includes a tilt correction process and a cutout process as predetermined image processing.

First, in step S11, the control portion 50 performs an edge detection process on the front side of the original document. Specifically, the edge detection processor 74 performs the edge detection process. The edge detection processor 74 performs, for example, a binarization process on read data of the front side, and detects an edge of which a density difference exceeds a predetermined threshold value. Since a region of the original document is white and the background is gray, a boundary line between the original document and the background is detected as the edge. That is, a contour line of the original document is detected as an edge. The original document is rectangular, and even when four sides thereof are slightly cut off, four vertices of the original document region can be specified from intersections of extension lines extending partial straight lines of the four sides. When the edges are detected at a level at which the four sides, which are contour lines of the original document, can be specified in above-described way, it is assumed that the edges for the original document front side can be detected. When the original document 14 has wrinkles or a background color of the original document 14 is similar to a color of the color reference plate 43, the edges cannot be detected at a level at which four sides of the original document region DA1 in the read data SD1 can be specified.

In step S12, it is determined whether or not an edge can be detected for the front side. When the edge can be detected for the front side, the flow proceeds to step S13, and, when the edge cannot be detected for the front side, the flow proceeds to step S16.

In step S13, the control portion 50 sets an edge detection flag F1 to "1" (F1=1).

In step S16, the control portion 50 sets the edge detection flag F1 to "0" (F1=0).

In step S14, the control portion 50 performs a tilt correction process on the original document front side. Specifically, the tilt correction processor 75 performs the tilt correction process. The tilt correction processor 75 obtains a tilt angle θ of the original document region DA1 specified by the four sides where edges can be detected in the read data SD1 of the front side, and calculates a tilt correction value for eliminating the tilt angle θ. This tilt correction value is indicated by a rotation angle for correcting the tilt due to a skew of the original document 14, and is, for example, a value within a range of −45°<θ<45°. The tilt correction processor 75 corrects the tilt of the original document region by rotating the original document region DA based on the tilt correction value by, for example, a correction angle −θ less than ±45°. As a result, as illustrated in FIG. 6, the original document region DA1 is corrected to a posture angle without the tilt.

Figure 7:
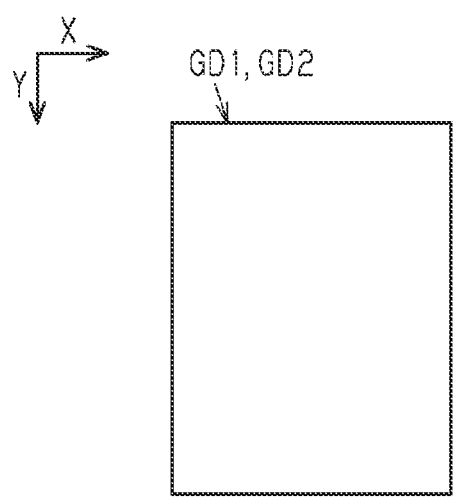
FIG. 7 is a schematic diagram illustrating image data of an original document generated through a cutout process.

In step S15, the control portion 50 performs a cutout process on the original document front side. Specifically, the cutout processor 76 performs the cutout process on the original document front side. The cutout processor 76 cuts out the original document region DA1 corresponding to the original document front side after tilt correction from the reading region SA1 defined by the read data SD1 of the front side. As a result of the cutout process, the original document region DA1 is cut out, and thus the image data GD1 of the original document front side illustrated in FIG. 7 is acquired.

In the next step S17, the control portion 50 performs an edge detection process on the original document rear side. Specifically, the edge detection processor 74 performs the same edge detection process as the process performed on the read data SD1 of the original document front side on the read data SD2 (refer to FIG. 4) of the original document rear side. As a result of the edge detection process, a contour line of the original document rear side is detected as an edge. Even when the four sides of the original document are slightly cut off, the four vertices of the original document region can be specified from the intersections of extension lines extending the partial straight lines of the four sides. When the edges are detected at a level at which the four sides, which are the contour lines of the original document, can be specified in above-described way, it is assumed that the edges for the original document rear side can be detected. As described above, when the original document 14 has wrinkles or a background color of the original document 14 is similar to a color of the color reference plate 43, the edges cannot be detected at a level at which four sides of the original document region DA2 in the read data SD2 can be specified. In the present embodiment, the processes in steps S11 and S17 correspond to examples of a detection process step of performing a predetermined detection process, a tilt angle detection process step of detecting a tilt angle of an image, and a region detection process step of detecting an original document region.

In step S18, the control portion 50 determines whether or not the edge can be detected for the rear side. When the edge can be detected for the rear side, the flow proceeds to step S19, and, when the edge cannot be detected for the rear side, the flow proceeds to step S24.

In step S19, the control portion 50 performs a tilt correction process on the original document rear side. Specifically, the tilt correction processor 75 performs the same tilt correction process as the process performed on the front side, on the read data SD2 of the rear side. The tilt correction processor 75 obtains a tilt of the original document region DA2 specified by the four sides where the edge can be detected in the read data SD2 of the rear side, and calculates a tilt correction value for eliminating the tilt. The tilt correction processor 75 corrects the tilt of the original document region DA2 by rotating the original document region DA2 by, for example, a correction angle −θ less than ±45° based on the tilt correction value. As a result, as illustrated in FIG. 6, the original document region DA2 is corrected to a posture angle without the tilt.

In step S20, the control portion 50 performs a cutout process on the original document rear side. Specifically, the cutout processor 76 performs the cutout process on the original document rear side. The cutout processor 76 cuts out an original document region DA2 corresponding to the original document rear side after tilt correction from the reading region SA2 defined by the read data SD2 of the rear side. As a result of the cutout process, the original document region DA2 is cut out, and thus the image data GD2 of the original document rear side illustrated in FIG. 7 is acquired.

In step S21, the control portion 50 determines whether or not the edge detection flag F1 is 0. When F1 is 0, the flow proceeds to step S22, and, when F1 is not 0, the routine is finished.

In step S22, the control portion 50 performs a tilt correction process on the original document front side based of the rear side correction value. That is, when the edge for the original document front side cannot be detected (F1=0), the tilt correction process is performed on the original document front side using the tilt correction value of the rear side that is an opposite side for which the edge can be detected. Here, as illustrated in FIG. 5, when the original document is skewed, the original document tilted at a predetermined angle with respect to the sub-scanning direction Y is read from the front side and the rear side, and thus the tilt angles θ1 and θ2 with respect to the sub-scanning direction Y are the same as each other but tilt directions are opposite to each other. That is, θ1=−θ2. From this relationship, in the read data SD, coordinates of the vertices of the original document region DA1 of the front side and coordinates of the vertices of the original document region DA2 of the rear side have a positional relationship in which coordinate values in the sub-scanning direction Y are the same as each other, and coordinate values in the main scanning direction X are linearly symmetric to each other with respect to a virtual line passing through the center of the original document and parallel to the sub-scanning direction Y.

Here, assuming that an x coordinate of the center of the original document region DA is the origin, the following relationship is established. Assuming that coordinates of four vertices of the original document region DA1 corresponding to one side of the original document are (x1,y1), (x2,y2), (x3,y3), and (x4,y4), coordinates of four vertices corresponding to the other side of the original document are indicated by (−x1,y1), (−x2,y2), (−x3,y3), and (−x4,y4). Therefore, when an edge can be detected for one side, even though the edge cannot be detected for the other side, the coordinates of the four vertices of the original document region of the other side can be specified from the coordinates of the four vertices of the original document region of one side, and thus the original document region DA1 of the other side can be specified from the coordinates of the four vertices. A relationship between tilt angles of the front side and the rear side of the original document is a relationship between one tilt angle θ and the other tilt angle −θ. In the above-described way, the original document region DA1 of the front side for which the edge cannot be detected and the tilt angle θ are specified. For convenience of description, the x coordinate of the center of the original document is assumed to be the origin, but the coordinate values of the four vertices can be calculated regardless of a set position of the origin.

In step S23, the control portion 50 performs a cutout process on the original document front side. Specifically, the cutout processor 76 cuts out the original document region DA1 corresponding to the original document front side after the tilt correction from the reading region SA1 defined by the read data SD1 of the front side. As a result of the cutout process, the original document region DA1 is cut out, and thus the image data GD1 of the original document front side illustrated in FIG. 7 is acquired.

On the other hand, when the edge cannot be detected for the rear side, in step S24, the control portion 50 determines whether or not the edge detection flag F1 is 1. When F1 is 1, the flow proceeds to step S25, and, when F1 is not 1, the routine is finished.

In step S25, a tilt correction process is performed on the original document rear side based of the front side correction value. That is, when the edge for the original document rear side cannot be detected, the tilt correction process is performed on the original document rear side using the tilt correction value of the front side that is an opposite side for which the edge can be detected. That is, the relationship illustrated in FIG. 5 described above, that is, the relationship between the coordinates (x1,y1), (x2,y2), (x3,y3), and (x4,y4) of the four vertices of the original document region DA1 corresponding to one side of the original document and the coordinates (−x1,y1), (−x2,y2), (−x3,y3), and (−x4,y4) of the four vertices corresponding to the other side of the original document is used. Therefore, when the edge can be detected for one side, even though the edge cannot be detected for the other side, the four vertices of the original document region of the other side are specified from the coordinates of the four vertices of the original document region of one side, and the original document region DA2 of the other side is specified from the specified coordinates of the four vertices. There is a relationship of θ1=−θ2 between the tilt angle θ1 of the original document region DA1 of the front side and the tilt angle θ2 of the original document region DA2 of the rear side. In the above-described way, the original document region DA2 of the rear side for which the edge cannot be detected and the tilt angle θ are specified.

In step S26, the control portion 50 performs a cutout process on the rear side. Specifically, the cutout processor 76 cuts out the original document region DA2 corresponding to the original document rear side after the tilt correction from the reading region SA2 defined by the read data SD2 of the rear side. As a result of the cutout process, the original document region DA2 is cut out, and thus the image data GD2 of the original document rear side illustrated in FIG. 7 is acquired.

In the present embodiment, the processes in steps S14, S15, S19, S20, S22, S23, S25, and S26 correspond to an example of an image processing step in which predetermined image processing is performed. The processes in steps S14, S19, S22, and S25 correspond to an example of a tilt correction process step. The processes in steps S15, S20, S23, and S26 correspond to an example of a cutout process step.

Next, the second image processing routine will be described with reference to FIG. 23.

First, in step S31, the control portion 50 performs a character detection process of detecting a character on the front side. The control portion 50 performs, for example, a pattern matching process on the image data GD1 of the front side using a predetermined registered character stored in advance in the storage section 61, to detect a character of which a similarity to the registered character is equal to or more than a threshold value. When a character is detected, the control portion 50 recognizes an orientation of the character from the detected character.

For example, in the example of the image data GD1 of the front side illustrated in FIGS. 8 and 10, the alphabet "A" and the number "2" are included as the same characters as the registered characters. Therefore, the control portion 50 detects the characters "A" and "2" as a result of the character detection process. In the example of horizontal binding illustrated in FIG. 8, regarding orientations of the characters "A" and "2", the characters are disposed in an orientation in which the short side of the original document is located above the characters. As illustrated in FIG. 8, a binding position of the original document in which the binding marks PT are located in the image data GD1 corresponds to horizontal binding in which the binding marks PT are located horizontally with respect to the characters in the original document. In the horizontally bound original document, the binding margin region FA is located at the lateral edge of the characters, and the binding marks PT such as punch holes are located in the binding margin region FA.

In the example of upper binding illustrated in FIG. 10, regarding orientations of the characters "A" and "2", the characters are disposed in an orientation in which the long side of the original document is located above the characters. As illustrated in FIG. 10, a binding position of the original document in which the binding marks PT are located in the image data GD1 corresponds to upper binding in which the binding marks PT are located above the characters in the original document. In the upper bound original document, the binding margin region FA is located at the upper edge of the characters, and the binding marks PT such as punch holes are located in the binding margin region FA.

In step S32, the control portion 50 determines whether or not a character can be detected for the front side. When the character is detected for the front side, a character detection flag F2 is set to "1" in step S33, and the flow proceeds to the next step S34. On the other hand, when the character cannot be detected for the front side, the character detection flag F2 is set to "0" in step S35, and the flow proceeds to step S36.

In step S34, the control portion 50 performs a rotation process on the original document front side. The control portion 50 determines a rotation angle at which a character orientation is vertical, and performs a rotation process of rotating the image data GD1 of the front side by the determined rotation angle. That is, as a result of the rotation process, the image data GD1 of the front side is disposed in the orientation illustrated in FIG. 8.

Figure 12:
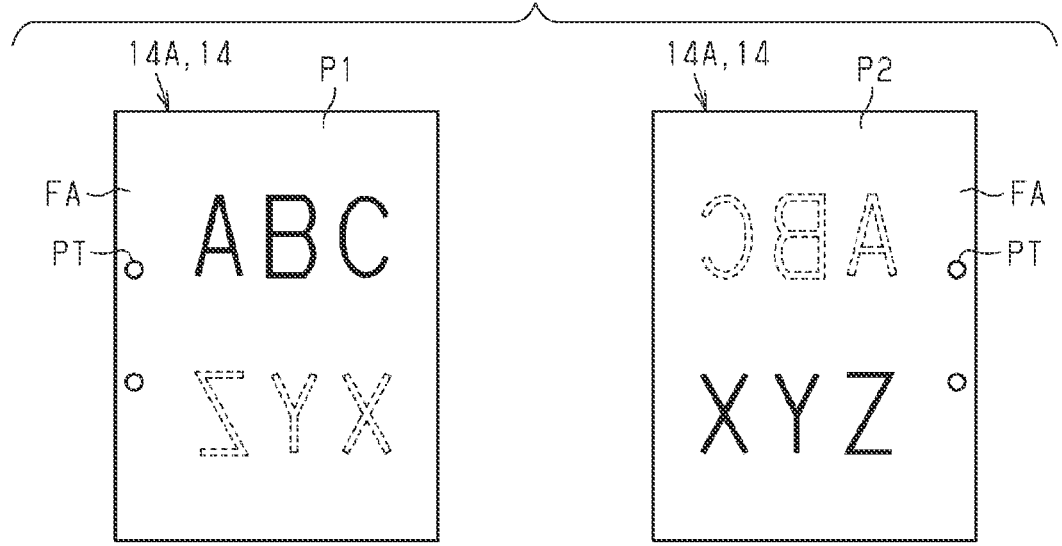
FIG. 12 is a schematic diagram illustrating a front side and a rear side of a horizontally bound original document.
Figure 13:
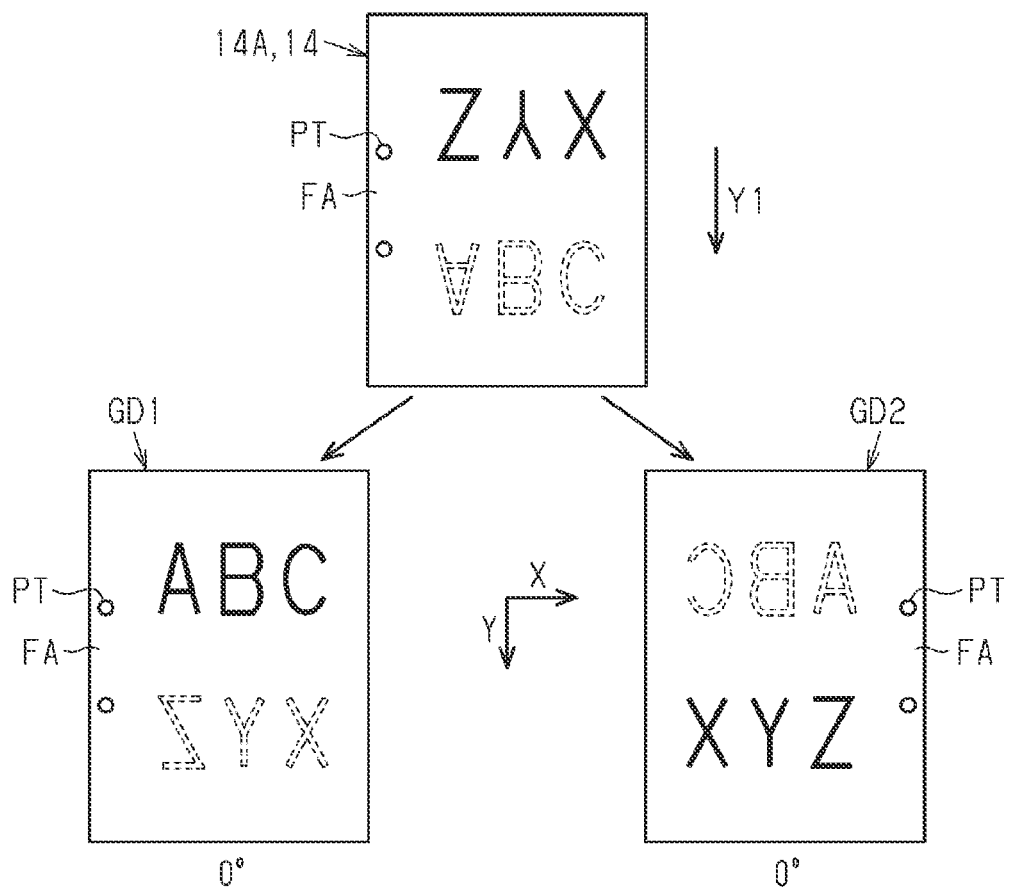
FIG. 13 is a schematic diagram illustrating a set orientation and image data of the front side and the rear side of the horizontally bound original document.

Here, when the horizontally bound original document 14A illustrated in FIG. 12 is scanned, the front side P1 and the rear side P2 have a relationship illustrated in FIG. 12. In the horizontally bound original document 14A illustrated in FIG. 12, characters are symbolically written in alphabets, and "ABC" are printed on the front side P1 and "XYZ" are printed on the rear side P2. There are four orientations for setting the horizontally bound original document 14A on the platen 13A of the original document support 13 as illustrated in FIGS. 13 to 16. The horizontally bound original document 14A set in these orientations is read in an orientation of the image data GD1 of the front side and an orientation of the image data GD2 of the rear side illustrated on the lower parts of the drawings. Thus, when each of image data GD1 and GD2 is rotated by a predetermined rotation angle in a clockwise direction CW described below, each of the image data GD1 and GD2 has characters disposed in an upright orientation as illustrated in FIGS. 8, 9, and 13. FIG. 13 illustrates an example in which the horizontally bound original document 14A is set on the platen 13A such that the front side of the horizontally bound original document 14A is read in a correct orientation.

In step S36, the control portion 50 performs a character detection process on the rear side. The control portion 50 performs, for example, a pattern matching process on the image data GD2 of the rear side using the predetermined registered character stored in advance in the storage section 61, to detect a character of which a similarity to the registered character is equal to or more than a threshold value. When a character is detected, the control portion 50 recognizes an orientation of the character from the detected character.

For example, in the example of the image data GD2 of the rear side illustrated in FIGS. 9 and 11, the alphabet "Y" and the number "7" are included as the same characters as the registered characters. Therefore, the control portion 50 detects the characters "Y" and "7" as a result of the character detection process. In the horizontally bound example illustrated in FIG. 9, the characters "Y" and "7" are disposed in an orientation in which the short side of the original document is located above the character. In the present embodiment, the processes in steps S31 and S36 correspond to an example of a predetermined detection process. The processes in step S31 and step S36 correspond to an example of a character detection process step.

As illustrated in FIG. 9, a binding position of the original document in which the binding marks PT are located in the image data GD2 corresponds to horizontal binding in which the binding marks PT are located horizontally with respect to the characters in the original document. In the horizontally bound original document 14A, the binding margin region FA indicated by a two-dot chain line is located at the lateral edge of the characters, and the binding marks PT such as punch holes are located in the binding margin region FA.

In the example of upper binding illustrated in FIG. 11, regarding orientations of the characters "Y" and "7" are disposed in an orientation in which the long side of the original document is located above the characters. As illustrated in FIG. 11, a binding position of the original document in which the binding marks PT are located in the image data GD2 corresponds to upper binding in which the binding marks PT are located above the characters in the original document. In the upper bound original document 14B, the binding margin region FA indicated by the two-dot chain line is located at the upper edge of the characters, and the binding marks PT such as punch holes are located in the binding margin region FA.

In step S37, the control portion 50 determines whether or not the character can be detected for the rear side. When the character is detected for the rear side, the flow proceeds to step S38. On the other hand, when the character cannot be detected for the rear side, the flow proceeds to step S43.

In step S38, the control portion 50 performs a rotation process on the original document rear side. The control portion 50 determines a rotation angle at which a character orientation is vertical, and performs a rotation process of rotating the image data GD2 of the rear side by the determined rotation angle. That is, as a result of the rotation process, the image data GD2 of the rear side is disposed in the orientation illustrated in FIG. 9.

Figure 17:
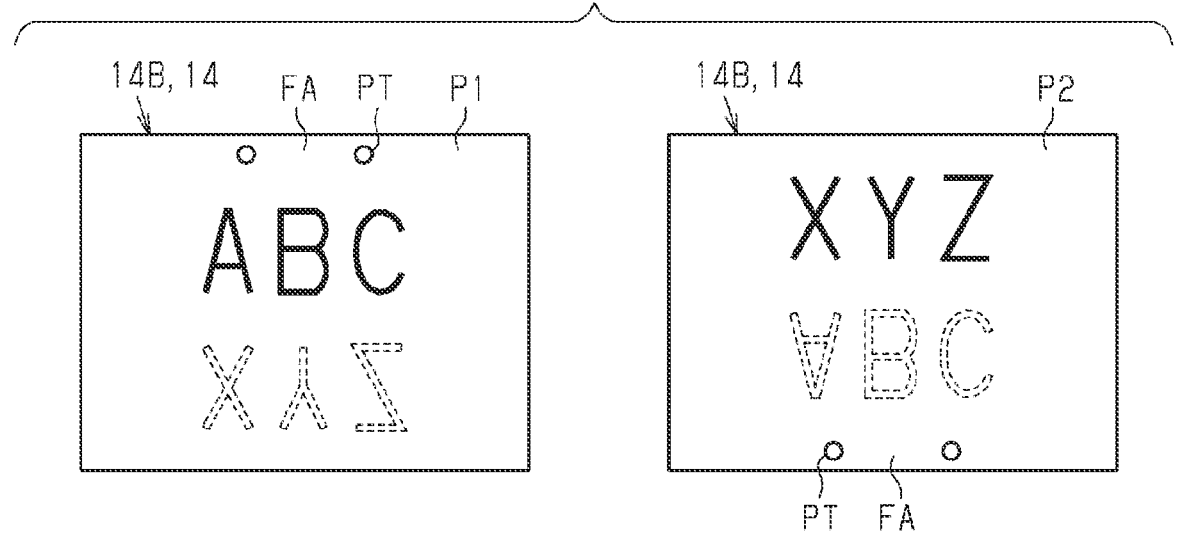
FIG. 17 is a schematic diagram illustrating a front side and a rear side of an upper bound original document.

Here, when the upper bound original document 14B illustrated in FIG. 17 is scanned, the front side P1 and the rear side P2 have a relationship illustrated in FIG. 17. In the upper bound original document 14B illustrated in FIG. 17, the characters are symbolically written in alphabets, and "ABC" are printed on the front side P1 and "XYZ" are printed on the rear side P2. There are four orientations for setting the upper bound original document 14B on the platen 13A of the original document support 13 as illustrated in FIGS. 18 to 21. The upper bound original document 14B set in these orientations is read in an orientation of the front image data GD1 of the front side and the orientation of the image data GD2 of the rear side illustrated on the lower parts of the drawings. Thus, when each of the image data GD1 and GD2 is rotated by a predetermined rotation angle in the clockwise direction CW described below, each of the image data GD1 and GD2 has characters disposed in an upright orientation as illustrated in FIGS. 10 and 11.

In the next step S39, the control portion 50 determines whether or not the character detection flag F2 is "0" (F2=0).

When F2 is 0, the flow proceeds to step S40, and, when F2 is not 0, the routine is finished.

In step S40, the control portion 50 determines whether or not a binding method is horizontal binding. The control portion 50 determines whether or not the binding method is horizontal binding (horizontally bound original document 14A) based on binding information. In the present embodiment, the rotation processor 77 of the control portion 50 performs a binding position detection process of detecting a binding position on the image data GD1 and GD2, and determines whether or not the binding method is horizontal binding based on the binding position detection result. The control portion 50 proceeds to step S41 when the binding method is horizontal binding, and proceeds to step S42 when the binding method is not horizontal binding, that is, when the binding method is upper binding (upper bound original document 14B).

In step S41, the control portion 50 performs a horizontal binding rotation process on the image data GD1 of the front side. Specifically, the control portion 50 executes a horizontal binding rotation process routine illustrated in the flowchart of FIG. 24. Details of the horizontal binding rotation process will be described later.

In step S42, the control portion 50 performs an upper binding rotation process on the image data GD1 of the front side. Specifically, the control portion 50 executes an upper binding rotation process routine illustrated in the flowchart of FIG. 25. Details of the upper binding rotation process will be described later.

On the other hand, when the character cannot be detected for the rear side in step S37 and the flow proceeds to step S43, in step S43, the control portion 50 determines whether or not the character detection flag F2 is "1" (F2=1). When F2 is 1, the flow proceeds to step S44, and, when F2 is not 1, the routine is finished.

In step S44, the control portion 50 determines whether or not a binding method is horizontal binding. The control portion 50 determines whether or not the binding method is horizontal binding (horizontally bound original document 14A) based on binding information. In the present embodiment, the rotation processor 77 of the control portion 50 performs a binding position detection process of detecting a binding position on the image data GD1 and GD2, and determines whether or not the binding method is horizontal binding based on the binding position detection result. The control portion 50 proceeds to step S45 when the binding method is horizontal binding, and proceeds to step S42 when the binding method is not horizontal binding, that is, when the binding method is upper binding (upper bound original document 14B).

In step S45, the control portion 50 performs a horizontal binding rotation process on the image data GD2 of the rear side. Specifically, the control portion 50 executes a horizontal binding rotation process routine illustrated in the flowchart of FIG. 24. Details of the horizontal binding rotation process will be described later.

In step S46, the control portion 50 performs an upper binding rotation process on the image data GD2 of the rear side. Specifically, the control portion 50 executes an upper binding rotation process routine illustrated in the flowchart of FIG. 25. Details of the upper binding rotation process will be described later. In the present embodiment, the processes in steps S34, S38, S41, S42, S45, and S46 correspond to an example of a rotation process.

Next, the horizontal binding rotation process routine illustrated in FIG. 24 and the upper binding rotation process routine illustrated in FIG. 25 will be described. The horizontal binding rotation process routine illustrated in FIG. 24 corresponds to each process in steps S41 and S45 in the image processing routine illustrated in FIG. 23. The upper binding rotation process routine illustrated in FIG. 25 corresponds to each process in step S42 and step S46 in the image processing routine illustrated in FIG. 23.

Here, when the horizontally bound original document 14A is scanned, there are four orientations of the original document 14A when the original document 14A is set on the platen 13A of the original document support 13 as illustrated in FIGS. 13 to 16. As illustrated in FIGS. 13 to 16, a combination of rotation angles at which the image data GD1 and the image data GD2 are to be rotated through the rotation process, of the image data GD1 of the front side and the image data GD2 of the rear side obtained by reading the original document 14A is uniquely determined according to an orientation in which the original document 14A is set, that is, an orientation in which the original document 14A is transported in the transport direction Y1. That is, when a rotation angle of one of the front side and the rear side of the original document 14A is known, a rotation angle of the other side is uniquely determined from the "horizontal binding" information of the binding position information.

When the upper bound original document 14B is scanned, there are four orientations of the original document 14B when the original document 14B is set on the platen 13A of the original document support 13 as illustrated in FIGS. 18 to 21. As illustrated in FIGS. 18 to 21, a combination of rotation angles by which the image data GD1 and the image data GD2 are to be rotated through the rotation process, of the image data GD1 of the front side and the image data GD2 of the rear side obtained by reading the original document 14B is uniquely determined according to an orientation in which the original document 14B is set, that is, an orientation in which the original document 14B is transported in the transport direction Y1. That is, when a rotation angle of one of the front side and the rear side of the original document 14B is known, a rotation angle of the other side is uniquely determined from the "upper binding" information of the binding position information.

First, the horizontal binding rotation process illustrated in FIG. 24 will be described with reference to FIGS. 13 to 16.

First, in step S51, the control portion 50 determines whether or not a rotation angle of an image of a side for which a character can be detected is 90 degrees. When the rotation angle of the image of the side for which the character can be detected is 90 degrees, the flow proceeds to step S52, and, when the rotation angle is not 90 degrees, the flow proceeds to step S53.

Figure 14:
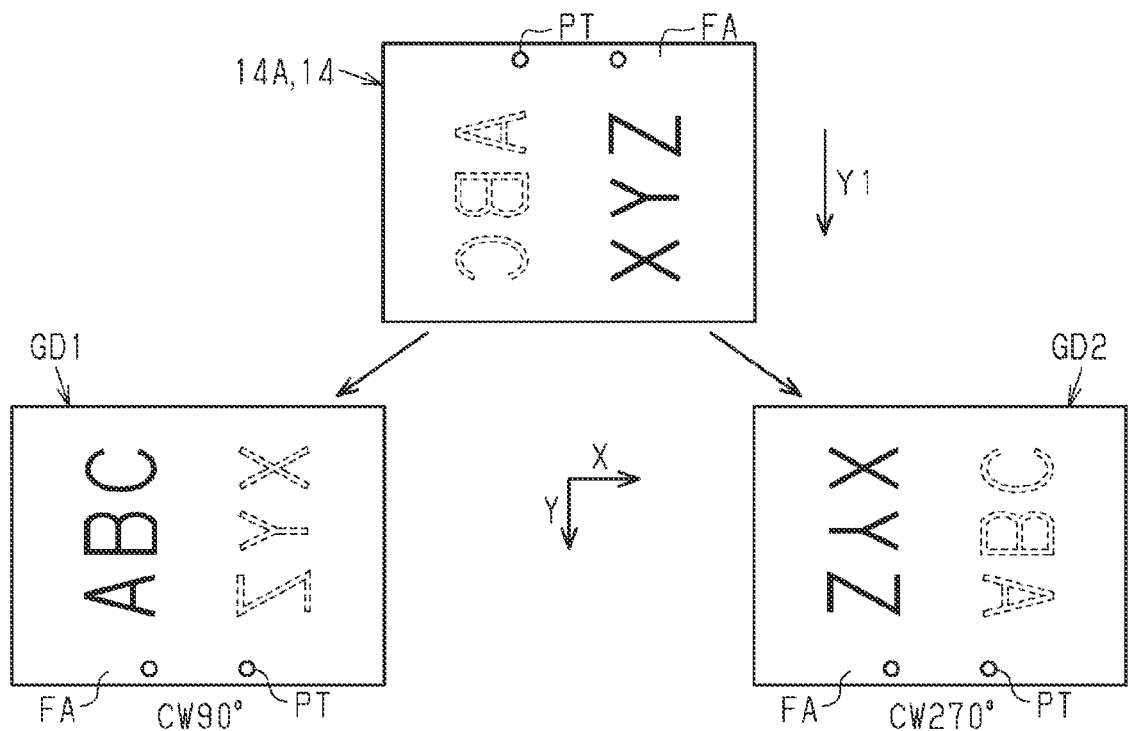
FIG. 14 is a schematic diagram illustrating a set orientation and image data of the front side and the rear side of the horizontally bound original document.
Figure 16:
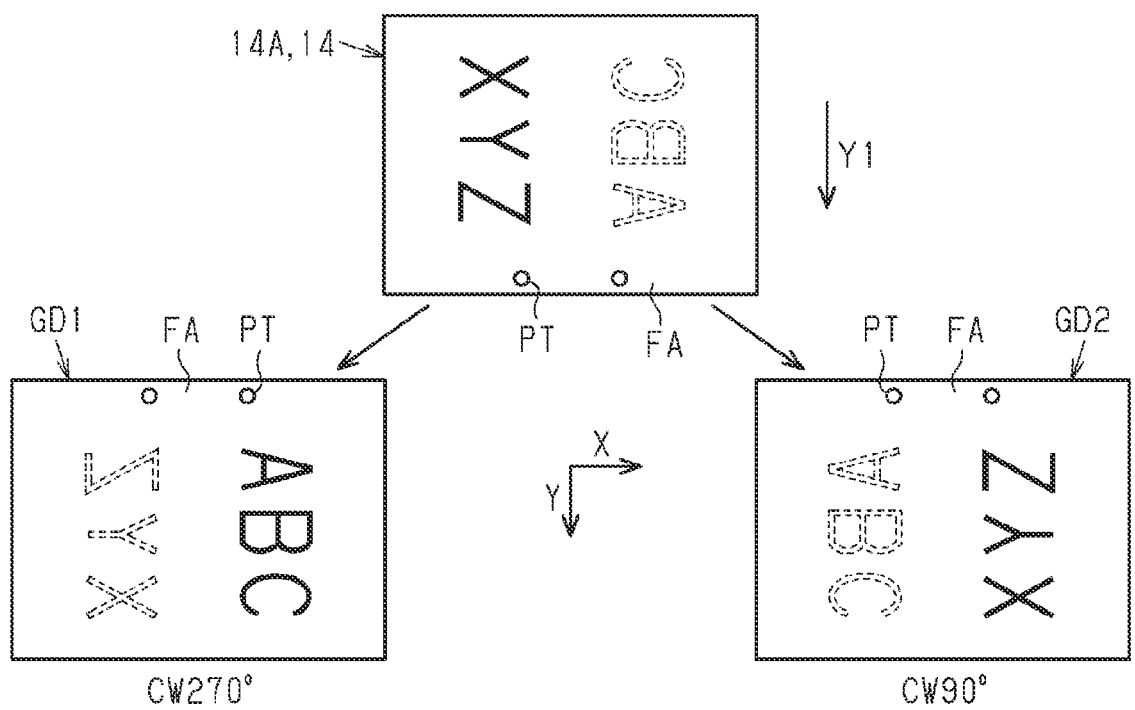
FIG. 16 is a schematic diagram illustrating a set orientation and image data of the front side and the rear side of the horizontally bound original document.

In step S52, the control portion 50 rotates the image of the side for which the character cannot be detected by 270 degrees. Specifically, this rotation process is performed by the rotation processor 77. As illustrated in FIG. 14, in a case of horizontal binding, when a rotation angle for rotating an image corresponding to the image data GD1 of the front side for which character detection is successful is 90 degrees, a rotation angle for rotating an image corresponding to the image data GD2 of the rear side for which character detection fails is 270 degrees. Therefore, the rotation processor 77 rotates the image data GD2 of the rear side by 270 degrees in the clockwise direction CW. As illustrated in FIG. 16, in a case of horizontal binding, when a rotation angle for rotating the image corresponding to the image data GD2 of the rear side for which character detection is successful is 90 degrees, a rotation angle for rotating the image corresponding to the image data GD1 of the front side for which character detection fails is 270 degrees. Therefore, the rotation processor 77 rotates the image data GD1 of the front side by 270 degrees in the clockwise direction CW.

In step S53, it is determined whether or not a rotation angle of an image of a side for which a character can be detected is 180 degrees. When the rotation angle of the image of the side for which the character can be detected is 180 degrees, the flow proceeds to step S54, and, when the rotation angle is not 180 degrees, the flow proceeds to step S55.

Figure 15:
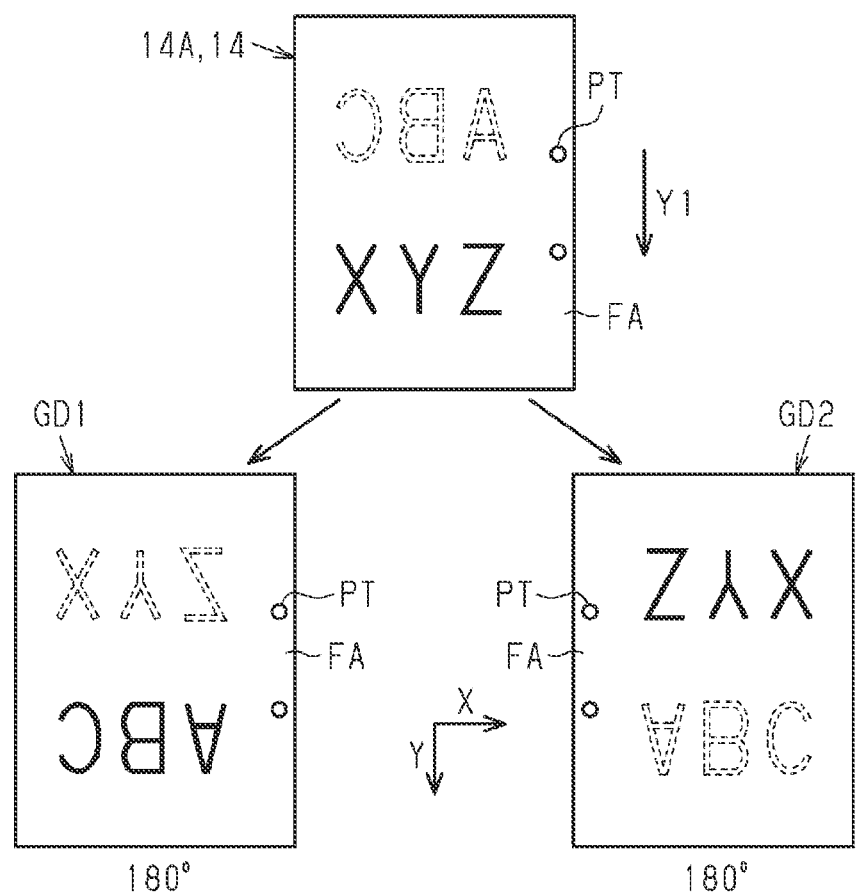
FIG. 15 is a schematic diagram illustrating a set orientation and image data of the front side and the rear side of the horizontally bound original document.

In step S54, the control portion 50 rotates the image of the side for which the character cannot be detected by 180 degrees. As illustrated in FIG. 15, in a case of horizontal binding, when a rotation angle for rotating an image corresponding to the image data GD1 of the front side for which character detection is successful is 180 degrees, a rotation angle for rotating an image corresponding to the image data GD2 of the rear side for which character detection fails is 180 degrees. Therefore, when character detection for the front side fails and character detection for the rear side is successful, the rotation processor 77 rotates the image data GD1 of the front side by 180 degrees. When character detection for the front side is successful and character detection for the rear side fails, the rotation processor 77 rotates the image data GD2 of the rear side by 180 degrees.

In step S55, it is determined whether or not a rotation angle of an image of a side for which a character can be detected is 270 degrees. When the rotation angle of the image of the side for which the character can be detected is 270 degrees, the flow proceeds to step S56, and, when the rotation angle is not 270 degrees, the routine is finished.

In step S56, the control portion 50 rotates the image of the side for which the character cannot be detected by 90 degrees. As illustrated in FIG. 14, in a case of horizontal binding, when a rotation angle for rotating the image corresponding to the image data GD2 of the rear side for which character detection is successful is 270 degrees, a rotation angle for rotating the image corresponding to the image data GD1 of the front side for which character detection fails is 90 degrees. Therefore, the rotation processor 77 rotates the image data GD1 of the front side by 90 degrees in the clockwise direction CW. As illustrated in FIG. 16, in a case of horizontal binding, when a rotation angle for rotating an image corresponding to the image data GD1 of the front side for which character detection is successful is 270 degrees, a rotation angle for rotating an image corresponding to the image data GD2 of the rear side for which character detection fails is 90 degrees. Therefore, the rotation processor 77 rotates the image data GD2 of the rear side by 90 degrees in the clockwise direction CW.

As illustrated in FIG. 13, in a case of horizontal binding, when a rotation angle of an image of a side for which the character can be detected is 0 degrees, a rotation angle of an image of a side for which the character cannot be detected is 0 degrees. Therefore, when the image of the side for which the character can be detected is not rotated (rotation angle=0 degrees), the control portion 50 does not perform special processing because the rotation angle for rotating the image of the opposite side for which the character cannot be detected is 0 degrees.

Next, the upper binding rotation process illustrated in FIG. 25 will be described with reference to FIGS. 18 to 21.

First, in step S61, the control portion 50 determines whether or not a rotation angle of an image of a side for which a character can be detected is 90 degrees. When the rotation angle of the image of the side for which the character can be detected is 90 degrees, the flow proceeds to step S62, and when the rotation angle is not 90 degrees, the flow proceeds to step S63.

Figure 21:
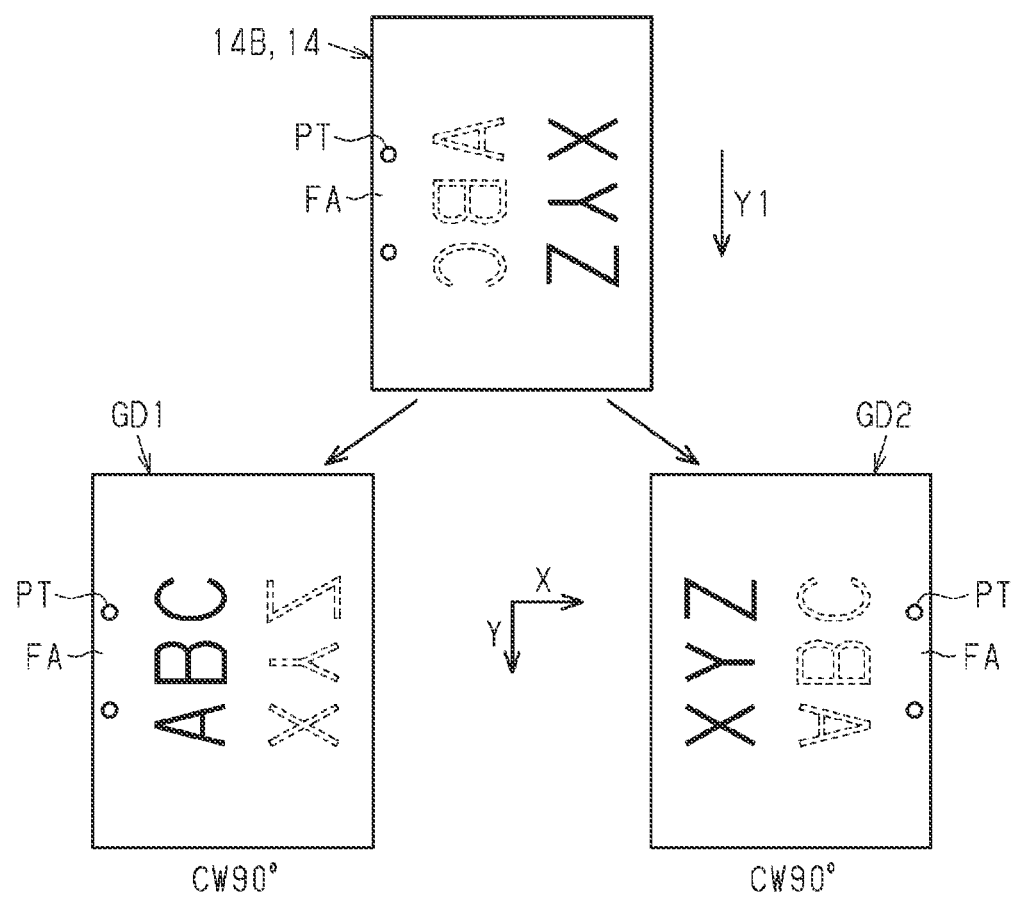
FIG. 21 is a schematic diagram illustrating a set orientation and image data of the front side and the rear side of the upper bound original document.

In step S62, the control portion 50 rotates the image of the side for which the character cannot be detected by 90 degrees. Specifically, this rotation process is performed by the rotation processor 77. As illustrated in FIG. 21, in a case of upper binding, when a rotation angle for rotating the image corresponding to the image data GD1 of the front side for which character detection is successful is 90 degrees, a rotation angle for rotating an image corresponding to the image data GD2 of the rear side for which character detection fails is 90 degrees. Therefore, the rotation processor 77 rotates the image data GD2 of the rear side by 90 degrees in the clockwise direction CW. When a rotation angle for rotating the image corresponding to the image data GD2 of the rear side for which character detection is successful is 90 degrees, a rotation angle for rotating the image corresponding to the image data GD1 of the front side for which character detection fails is 90 degrees. Therefore, the rotation processor 77 rotates the image data GD1 of the front side by 90 degrees in the clockwise direction CW.

In step S63, it is determined whether or not a rotation angle of an image of a side for which a character can be detected is 180 degrees. When the rotation angle of the image of the side for which the character can be detected is 180 degrees, the routine is finished, and, when the rotation angle is not 180 degrees, the flow proceeds to step S64.

In step S64, it is determined whether or not a rotation angle of an image of a side for which a character can be detected is 270 degrees. When the rotation angle of the image of the side for which the character can be detected is 270 degrees, the flow proceeds to step S65, and, when the rotation angle is not 270 degrees, the flow proceeds to step S66.

Figure 19:
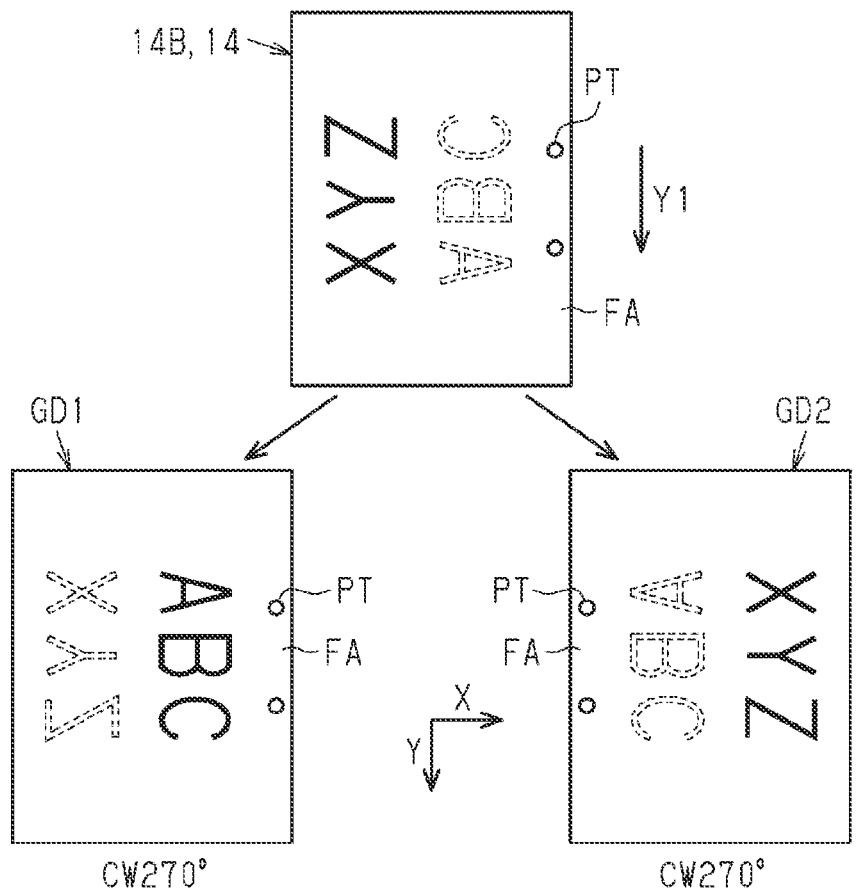
FIG. 19 is a schematic diagram illustrating a set orientation and image data of the front side and the rear side of the upper bound original document.

In step S65, the control portion 50 rotates the image of the side for which the character cannot be detected by 270 degrees. As illustrated in FIG. 19, in a case of upper binding, when a rotation angle for rotating an image corresponding to the image data GD1 of the front side for which character detection is successful is 270 degrees, a rotation angle for rotating an image corresponding to the image data GD2 of the rear side for which character detection fails is 270 degrees. Therefore, the rotation processor 77 rotates the image data GD2 of the rear side by 270 degrees in the clockwise direction CW. When a rotation angle for rotating an image corresponding to the image data GD2 of the rear side for which character detection is successful is 270 degrees, a rotation angle for rotating an image corresponding to the image data GD1 of the front side for which character detection fails is 270 degrees. Therefore, the rotation processor 77 rotates the image data GD1 of the front side by 270 degrees in the clockwise direction CW.

Figure 18:
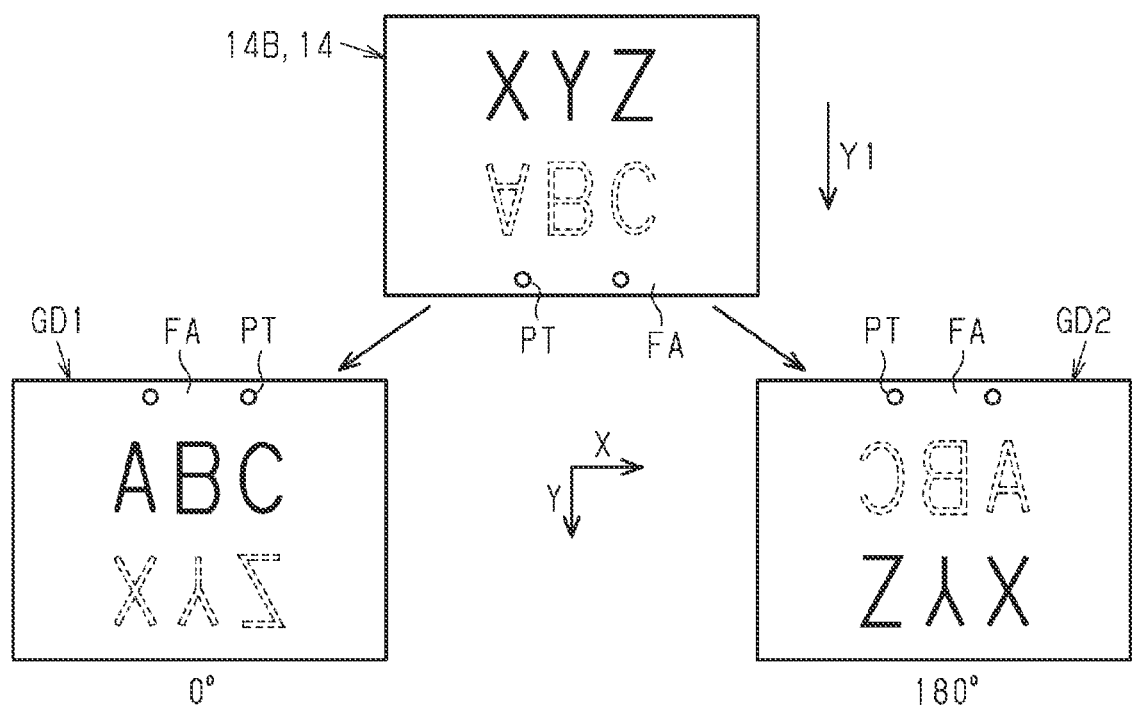
FIG. 18 is a schematic diagram illustrating a set orientation and image data of the front side and the rear side of the upper bound original document.
Figure 20:
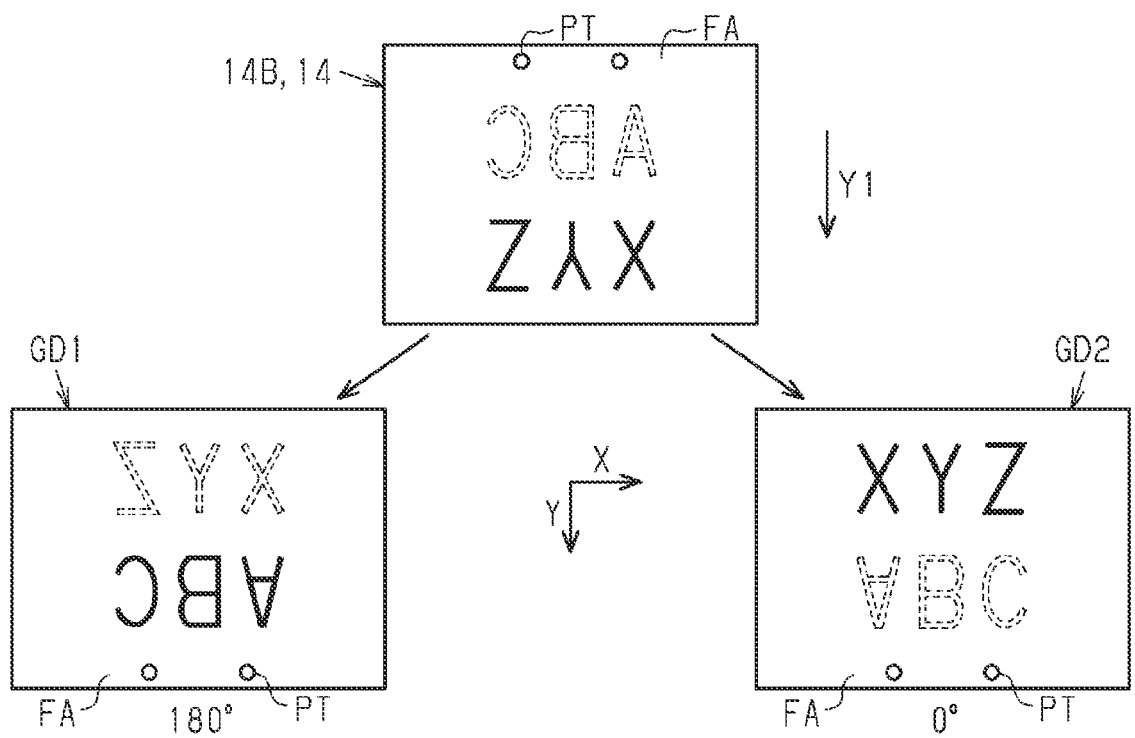
FIG. 20 is a schematic diagram illustrating a set orientation and image data of the front side and the rear side of the upper bound original document.

In step S66, the control portion 50 rotates the image of the side for which the character cannot be detected by 180 degrees. That is, when the rotation angle of the image of the side for which the character can be detected is not 90 degrees (negative determination in step S61) 180 degrees (negative determination in step S63), or 270 degrees (negative determination in step S64), the rotation angle is 0 degrees. As illustrated in FIG. 18, in a case of upper binding, when a rotation angle for rotating the image corresponding to the image data GD1 of the front side for which character detection is successful is 0 degrees, a rotation angle for rotating an image corresponding to the image data GD2 of the rear side for which character detection fails is 180 degrees. Therefore, the rotation processor 77 rotates the image data GD2 of the rear side by 180 degrees. As illustrated in FIG. 20, in a case of upper binding, when a rotation angle for rotating the image corresponding to the image data GD2 of the rear side for which character detection is successful is 0 degree, a rotation angle for rotating the image corresponding to the image data GD1 of the front side for which character detection fails is 180 degrees. Therefore, the rotation processor 77 rotates the image data GD1 of the front side by 180 degrees.

According to the present embodiment, the following effects can be achieved.

1. The image reading apparatus 11 reads an original document and acquires an image. The image reading apparatus 11 includes the first reading portion 40A that reads the first side P1 of the original document 14 to acquire a first image, the second reading portion 40B that reads the second side P2 that is a side opposite to the first side P1 of the original document 14 to acquire a second image, and the control portion 50 that performs a predetermined detection process on the first image and a predetermined detection process on the second image. When the predetermined detection process is successful for the first image, the control portion 50 performs predetermined image processing on the first image based on a value of an image processing variable specified from the detection result of the predetermined detection process. When the predetermined detection process is successful for the second image, the control portion 50 performs predetermined image processing on the second image based on a value of an image processing variable specified from the detection result of the predetermined detection process. When the predetermined detection process on an image of one of the first side P1 and the second side P2 fails, the control portion 50 specifies a value of an image processing variable for the image of one side based on a value of an image processing variable specified from the detection result of the predetermined detection process on the image of the other side for which the predetermined process is successful among the first side P1 and the second side P2. The control portion 50 performs predetermined image processing on the image of one side based on the specified value of the image processing variable.

Therefore, when the predetermined detection process for one of the first side P1 and the second side P2 fails, the value of the image processing variable for the image of one side is specified based on the value of the image processing variable specified from the detection result of the predetermined detection process on the image of the other side for which the predetermined process is successful among the first side P1 and the second side P2, and the predetermined image processing is performed on the image of one side based on the specified value of the image processing variable. Therefore, even when the predetermined detection process for one side fails, it is possible to acquire images of both sides subjected to appropriate image processing.

2. The predetermined detection process is a tilt angle detection process of detecting the tilt angles θ1 and θ2 of the original document regions DA1 and DA2 in the images. The predetermined image processing is a tilt correction process of correcting tilts of the original document regions DA1 and DA2 to be small. When the tilt angle detection process on the image of one of the first side P1 and the second side P2 fails, the control portion 50 specifies the tilt angle θ1 or θ2 of the original document region DA1 or DA2 in the image of one side based on a tilt angle specified from a detection result of the tilt angle detection process on the image of the other side for which the tilt angle detection process is successful among the first side P1 and the second side P2. The control portion 50 performs the tilt correction process on the image of one side based on the specified tilt angle θ1 or θ2. Therefore, even when the tilt detection process on the image of one side fails, it is possible to acquire the image data GD1 and GD2 of both sides in which the original document regions DA1 and DA2 are subjected to appropriate tilt correction.

3. The predetermined detection process is an edge detection process that is an example of a region detection process of detecting the original document regions DA1 and DA2 in images. The predetermined image processing is a cutout process of cutting out the original document regions DA1 and DA2 from the images. When the region detection process on an image of one of the first side P1 and the second side P2 fails, the control portion 50 specifies position coordinate values of the original document region DA1 or DA2 in the image of one side as values of image processing variables based on position coordinate values of the original document region specified from the detection result of the region detection process on the image of the other side for which the region detection process is successful among the first side P1 and the second side P2. The control portion 50 performs the cutout process of cutting out the original document region from the image of one side based on the specified position coordinate values of the original document region. Therefore, even when the region detection process on the image of one side fails, the image data GD1 and GD2 of both sides cut out into the appropriate original document regions DA1 and DA2 can be acquired.

4. The predetermined detection process includes a character detection process of detecting a character in an image. The predetermined image processing includes a rotation process of rotating the image based on a rotation angle specified from an orientation of the detected character. When the character detection process of detecting a character in an image of one of the first side P1 and the second side P2 fails, the control portion 50 specifies a rotation angle specified from an orientation of the character in the image of one side as a value of an image processing variable based on a rotation angle specified from the detection result of the character detection process of detecting the character in the image of the other side for which the character detection process is successful among the first side P1 and the second side P2. The control portion 50 performs the rotation process of rotating the image of one side at the rotation angle according to the specified orientation of the character. Therefore, even when the character detection process for one side of the original document 14 fails, it is possible to acquire the image data GD1 and GD2 of both sides in an appropriate orientation according to the orientation of the character.

5. The control portion 50 acquires binding position information regarding a binding position of the original document 14. When the character detection process of detecting a character in an image of one of the first side P1 and the second side P2 fails, the control portion 50 specifies a rotation angle determined from an orientation of the character in the image of one side as a value of an image processing variable based on a rotation angle specified from the detection result of the character detection process of detecting the character in the image of the other side for which the character detection process is successful among the first side P1 and the second side P2, and the binding position information. The control portion 50 performs the rotation process of rotating the image of one side based on the specified rotation angle. Therefore, even when the character detection process of detecting the character in the image of one of the first side P1 and the second side P2 of the original document 14 fails, an orientation of the character in the image of one side can be more appropriately specified based on the detection result of the character detection process of detecting the character in the image of the other side for which the character detection process is successful, and the binding position information. Therefore, even when the character detection process on the image of one side fails, the image data GD1 and GD2 of both sides can be acquired in a more appropriate orientation according to the orientation of the character.

6. As the predetermined detection process, the control portion 50 performs a binding position detection process of detecting the binding mark PT on an image of at least one of the first side P1 and the second side P2, to acquire binding position information. Therefore, even when the character detection process on the image of one side fails, the image data GD1 and GD2 of both sides can be acquired in a more appropriate orientation according to an orientation of the character while reducing the time and effort for an operation of inputting the binding position information.

7. The image reading method includes a reading step of reading the first side P1 and the second side P2 of the original document, a detection process step, and an image processing step. In the detection process step, a predetermined detection process is performed on the first image obtained by reading the first side P1 of the original document 14, and a predetermined detection process is also performed on the second image obtained by reading the second side P2 opposite to the first side P1 of the original document 14. In the image processing step, when the predetermined detection process for the first image is successful, the predetermined image processing is performed on the first image based on a value of an image processing variable specified from the detection result of the predetermined detection process, and when the predetermined detection process for the second image is successful, the predetermined image processing is performed on the second image based on a value of an image processing variable specified from the detection result of the predetermined detection process. In the image processing step, when the predetermined detection process on the image of one of the first side P1 and the second side P2 fails, a value of an image processing variable for the image of one side is specified based on a value of an image processing variable specified from the detection result of the predetermined detection process on the image of the other side for which the predetermined detection process is successful among the first side P1 and the second side P2, and the predetermined image processing is performed on the image of one side based on the specified value of the image processing variable. Therefore, according to the image reading method, the same effect as that of the image reading apparatus 11 can be achieved.

8. The program PR causes the computer 60 to execute the detection process step and the image processing step. In the detection process step, a predetermined detection process is performed on the first image obtained by reading the first side P1 of the original document, and a predetermined detection process is also performed on the second image obtained by reading the second side P2 opposite to the first side P1 of the original document. In the image processing step, when the predetermined detection process for the first image is successful, the predetermined image processing is performed on the first image based on a value of an image processing variable specified from the detection result of the predetermined detection process, and when the predetermined detection process for the second image is successful, the predetermined image processing is performed on the second image based on a value of an image processing variable specified from the detection result of the predetermined detection process. In the image processing step, when the predetermined detection process on the image of one of the first side P1 and the second side P2 fails, a value of an image processing variable for the image of one side is specified based on a value of an image processing variable specified from the detection result of the predetermined detection process on the image of the other side for which the predetermined detection process is successful among the first side P1 and the second side P2, and the predetermined image processing is performed on the image of one side based on the specified value of the image processing variable. Therefore, when the computer 60 executes the program PR, the same effect as that of the image reading apparatus 11 can be achieved.

Second Embodiment

Figure 26:
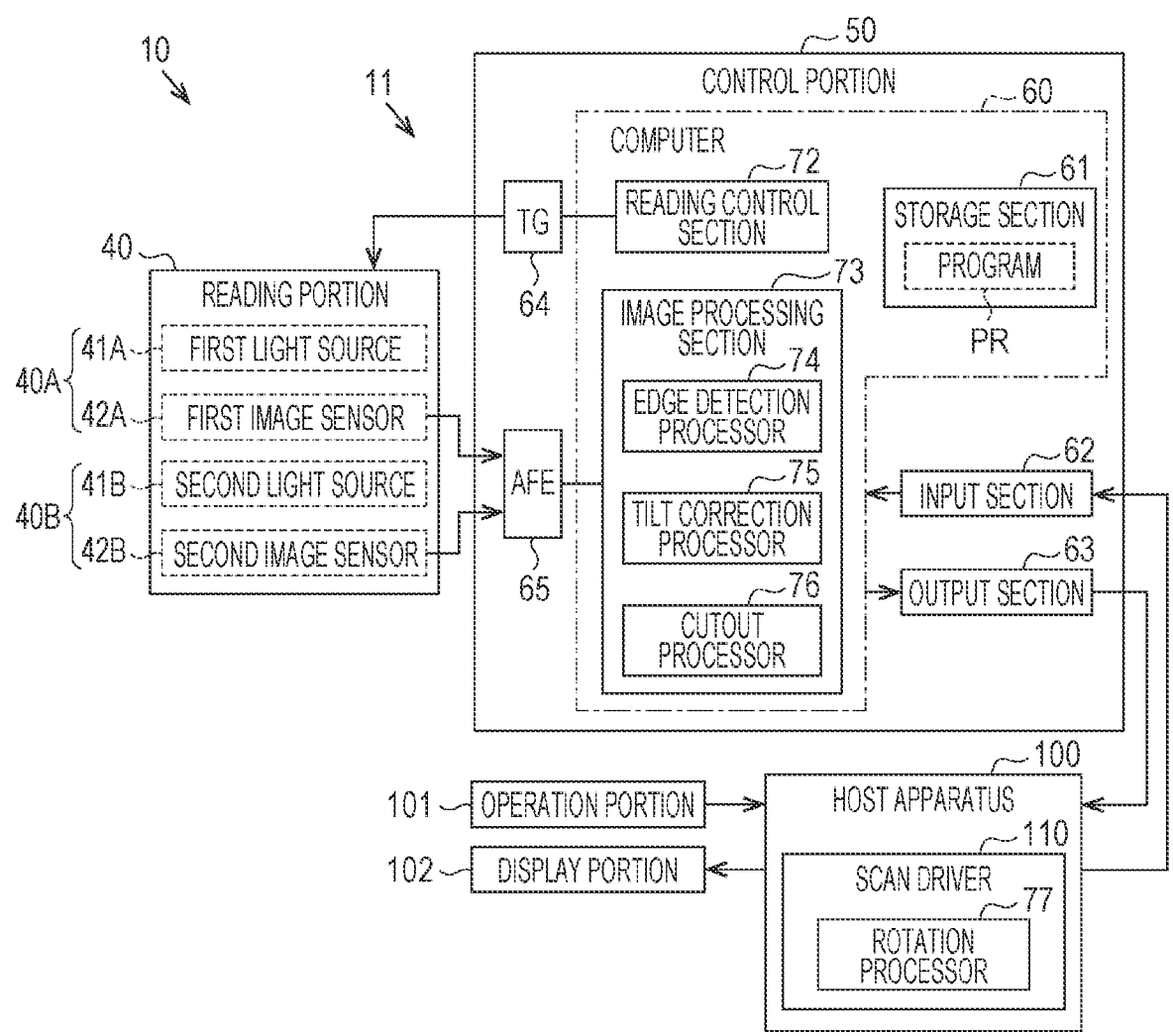
FIG. 26 is a block diagram illustrating an electric configuration of an image reading system according to a second embodiment.

Next, a second embodiment will be described with reference to FIG. 26. This second embodiment is different from the first embodiment in that a rotation process is performed by a scan driver as an example of a reading control device provided in the host apparatus 100. Since configurations of the remaining constituents are fundamentally the same as those of the first embodiment, the same reference numerals are given to the same constituents and description thereof will be omitted. In FIG. 26, some configurations of the operation system, the display system, and the transport system of the image reading apparatus 11 are omitted.

As illustrated in FIG. 26, the image reading apparatus 11 includes an edge detection processor 74, a tilt correction processor 75, and a cutout processor 76 in an image processing section 73. The host apparatus 100 includes a scan driver 110 configured with software. The scan driver 110 includes a rotation processor 77. In the present embodiment, the scan driver 110 corresponds to an example of a reading control device.

The edge detection processor 74 of the image reading apparatus 11 performs an edge detection process. The tilt correction processor 75 performs a tilt correction process on the read data SD1 and SD2 based on an edge detection result. The cutout processor 76 performs a cutout process of cutting out the original document regions DA1 and DA2 from the read data SD1 and SD2, respectively, to generate image data GD1 and GD2. The control portion 50 of the image reading apparatus 11 executes the first image processing routine illustrated in the flowchart of FIG. 22.

The host apparatus 100 receives the image data GD1 and GD2 obtained through the cutout process from the image reading apparatus 11. The scan driver 110 of the host apparatus 100 performs a rotation process on the image data GD1 and GD2. The scan driver 110 of the present embodiment includes a control portion (not illustrated), and the control portion executes the second image processing routine illustrated in the flowchart in FIGS. 23 to 25.

The control portion of the scan driver 110 performs a predetermined detection process including a character detection process on the image data GD1 and GD2 received from the image reading apparatus 11. Even though the control portion fails in detection for one side as a result of the predetermined detection process, when the detection is successful for the other side, the control portion can specify a rotation angle for an image of one side for which character detection fails based on a detection result (character orientation) of the other side for which detection is successful and a rotation angle specified from the binding position information. Therefore, the control portion of the scan driver 110 can perform a rotation process as predetermined image processing on the image data GD1 and GD2 of both sides of the original document. The control portion of the scan driver 110 may acquire the binding position information by inputting the binding position information via the operation portions 21 and 101, or may perform a binding position detection process and acquire the binding position information as a detection result thereof.

Therefore, according to the image reading system 10 in the second embodiment, the effects of 1. to 7. achieved by the image reading apparatus 11 in the first embodiment can be achieved in the same manner, and the following effects can also be achieved.

9. The image reading system 10 includes the image reading apparatus 11 and the scan driver 110 as an example of a reading control device that is communicably connected to the image reading apparatus 11 in a wired or wireless manner. The scan driver 110 includes the rotation processor 77 as an example of an image processor that performs at least part of at least predetermined image processing of a predetermined detection process and the predetermined image processing instead of the image reading apparatus 11. Therefore, since the scan driver 110 configuring the image reading system 10 shares at least a part of the rotation process of the predetermined image processing, a processing load on the image reading apparatus 11 can be reduced. According to the image reading system 10, even when a predetermined detection process on an image of one of both sides of an original document fails, it is possible to acquire images of both sides subjected to appropriate image processing.

Third Embodiment

Figure 27:
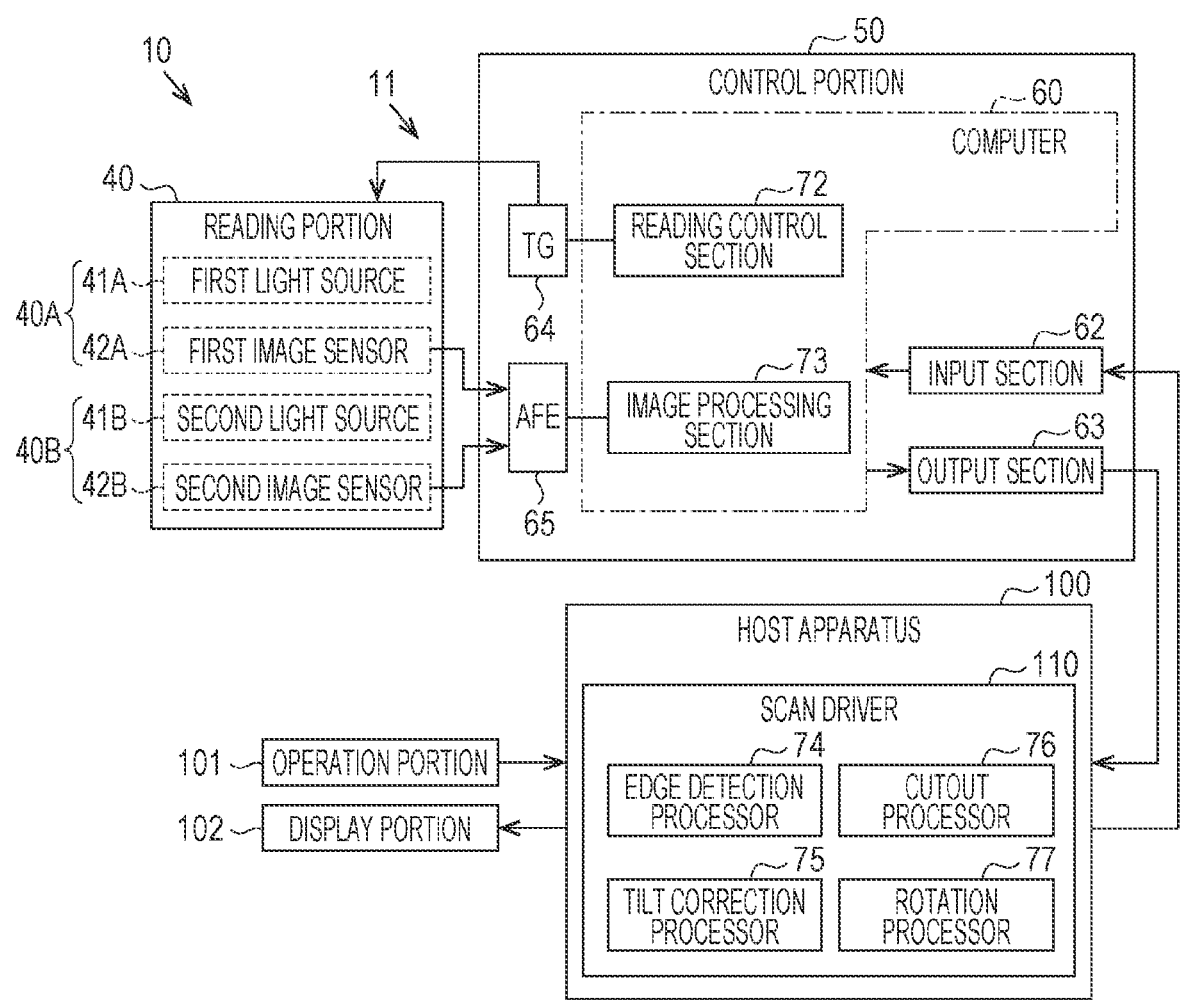
FIG. 27 is a block diagram illustrating an electric configuration of an image reading system according to a third embodiment.

Next, a third embodiment will be described with reference to FIG. 27. The third embodiment is different from the first embodiment in that an edge detection process, a tilt correction process, a cutout process, and a rotation process are performed by a scan driver 110 as an example of a reading control device provided in the host apparatus 100. Since configurations of the remaining constituents are fundamentally the same as those of the first embodiment, the same reference numerals are given to the same constituents and description thereof will be omitted. In FIG. 27, some configurations of the operation system, the display system, and the transport system of the image reading apparatus 11 are omitted.

As illustrated in FIG. 27, the image reading apparatus 11 includes an image processing section 73. The image processing section 73 of the present embodiment does not perform the edge detection process, the tilt correction process, the cutout process, and the rotation process. The host apparatus 100 includes a scan driver 110 configured with software. The scan driver 110 includes an edge detection processor 74, a tilt correction processor 75, a cutout processor 76, and a rotation processor 77.

The host apparatus 100 receives the read data SD1 and SD2 from the image reading apparatus 11. The scan driver 110 of the host apparatus 100 performs the edge detection process, the tilt correction process, the cutout process, and the rotation process. Specifically, in the scan driver 110, the edge detection processor 74 performs the edge detection process on the read data SD1 and SD2 received by the host apparatus 100. The tilt correction processor 75 performs the tilt correction process on the image data GD1 and GD2 based on the edge detection result. The cutout processor 76 performs the cutout process of cutting out the original document regions DA1 and DA2 from the read data SD1 and SD2 to generate the image data GD1 and GD2.

A control portion of the scan driver 110 of the present embodiment executes the first image processing routine illustrated in the flowchart in FIG. 22 and the second image processing routine illustrated in the flowchart in FIGS. 23 to 25. Therefore, even though detection for one side fails as a result of performing a predetermined detection process on the read data SD1 and SD2 of the front side and the rear side obtained by the reading portions 40A and 40B reading both sides of the original document 14, when the detection is successful for the other side, a value of an image processing variable for one side can be specified based on a value of an image processing variable (tilt angle/position coordinate value) specified from the detection result for the other side for which the detection is successful. Therefore, the control portion of the scan driver 110 can perform predetermined image processing on the read data SD1 or SD2 based on the specified value of the image processing variable. Even though character detection for one side fails as a result of performing a character detection process on the image data GD1 and GD2 of the original document, when character detection is successful for the other side, a rotation angle for an image of one side for which the character detection fails can be specified based on a rotation angle that is specified based on the character detection result for the other side for which the character detection is successful and the binding position information. Thus, the control portion of the scan driver 110 can perform the rotation process as the predetermined image processing on the image data GD1 or GD2 based on the specified rotation angle.

Therefore, according to the image reading system 10 in the third embodiment, the effects of 1. to 7. achieved by the image reading apparatus 11 in the first embodiment can be achieved in the same manner, and the following effects can also be achieved.

10. The image reading system 10 includes the image reading apparatus 11 and the scan driver 110 as an example of a reading control device that is communicably connected to the image reading apparatus 11 in a wired or wireless manner. The scan driver 110 includes the edge detection processor 74, the tilt correction processor 75, the cutout processor 76, and the rotation processor 77 as an example of an image processor that performs a predetermined detection process and predetermined image processing instead of the image reading apparatus 11. Therefore, since the scan driver 110 configuring the image reading system 10 performs the predetermined detection process and the predetermined image processing, a processing load on the image reading apparatus 11 can be significantly reduced, and it is possible to acquire images of both sides subjected to appropriate image processing even when the predetermined detection process on an image of one side fails.

The above embodiments may also be changed to forms such as modification examples described below. An appropriate combination of the above embodiments and the modification examples described below may be a further modification example, or an appropriate combination of the modification examples described below may be a further modification example.

When a character is not detected through the character detection process, the rotation processor 77 may estimate a binding position from a character detection result for a side for which the character is detected without using the binding position information. For example, when an orientation of a character for one side for which the character can be detected is an orientation in which an upper part of the character faces a short side of an original document region, horizontal binding is estimated, and a rotation angle for rotating an image of the other side is specified based on the estimated binding position information and the orientation of the character. For example, when an orientation of a character for one side for which the character can be detected is an orientation in which an upper part of the character faces a long side of an original document region, upper binding is estimated, and a rotation angle for rotating an image of the other side is specified based on the estimated binding position information and the orientation of the character.

The predetermined detection process may be a tilt angle detection process of detecting the tilt angle θ. A tilt correction process may be performed as the predetermined image processing based on the tilt angle. The predetermined detection process may be an original document position detection process of detecting a position of an original document region. A cutout process may be performed as the predetermined image processing based on the position of the original document region detected through the original document position detection process.

The predetermined detection process may include one of the edge detection process, the tilt angle detection process, the region detection process, the character detection process, and the binding position detection process. For example, when the predetermined detection process includes only one process, the predetermined detection process may be the edge detection process, may be the tilt angle detection process, may be the region detection process, may be the character detection process, and may be the binding position detection process. When the predetermined detection process includes only two processes, the predetermined detection process may be the edge detection process and the character detection process, and may be the character detection process and the binding position detection process. The predetermined detection process may include three processes or may include four processes. The predetermined detection process may include other detection processes other than the above four processes. For example, a vertex detection process of detecting vertices of an original document region may be used.

The predetermined image processing may include one of the tilt correction process, the cutout process, and the rotation process. For example, when only one process is included, the predetermined image processing may be the tilt correction process, may be the cutout process, and may be the rotation process. When only two processes are included, the predetermined image processing may be the tilt correction process and the cutout process, may be the tilt correction process and the rotation process, and may be the cutout process and the rotation process. The predetermined image processing may include other image processing other than the above three processes.

The tilt angle of the image of one of the first side and the second side that failed in the edge detection process may be calculated from the tilt angle of the image of the other side that succeeded in the edge detection process. When a tilt angle of an image of one side for which the edge detection process fails is obtained, position coordinate values of an original document region in the image of one side for which the edge detection process fails may be calculated based on position coordinate values of an original document region in an image of the other side for which the edge detection process is successful, and the tilt angle may be calculated based on the position coordinate values of the original document region.

In the embodiments, a rotation angle is specified based on a character orientation specified from the detection result of the character detection process and the binding position information, but the rotation angle may be specified based on the character orientation specified from the detection result of the character detection process without using the binding position information. For example, a rotation angle at which a character orientation is a reading orientation is specified. A rotation angle may be specified based on binding position information specified from the detection result of the binding position detection process without performing the character detection process. For example, assuming that an original document is horizontally bound, a rotation angle may be specified in an orientation in which a detected binding position is the left on the front side and is the right on the rear side.

In the second embodiment and the third embodiment, a CPU (not illustrated) (hereinafter referred to as the "scan driver 110 or the like") executing the scan driver 110 or application software installed in the host apparatus 100 such as a PC or a smartphone that receives the image data GD1 and GD2 or the read data SD1 and SD2 from the image reading apparatus 11 may determine a front side/rear side. The scan driver 110 or the like determines, for example, an odd-numbered page of the image data GD1 and GD2 or the read data SD1 and SD2 as the front side and an even-numbered page as the rear side. When the image reading apparatus 11 transmits data (file) to the host apparatus 100 in a predetermined format such as JPEG, characters or a character string for identifying the front side/rear side may be added to a file name such as JPEG. Characters, a character string, and other predetermined information for identifying the front side/rear side may be added to a header or a user area that is an area that does not affect an image in a file such as JPEG. Since defined commands are typically used in a communication process between the image reading apparatus 11 and the host apparatus 100, a command for defining the front side and the rear side may be added. In this case, the command may be processed as a command indicating that there is a pair of front and rear sides every two sides, instead of information such as the front side/rear side. These methods are employed, and thus the scan driver 110 or the like of the host apparatus 100 that receives the image data GD1 and GD2 or the read data SD1 and SD2 can identify the front side and the rear side.

In the embodiments, the order of the edge detection process for the front side and the rear side of the original document may be freely selected.

In the embodiments, the order of the tilt correction process for the front side and the rear side of the original document may be freely selected.

In the embodiments, the order of the cutout process for the front side and the rear side of the original document may be freely selected.

The operation portion 21 is not limited to a touch panel, and may be, for example, an operation button.

The transport portion 31 and the discharge portion 32 are not limited to sharing a power source, and the transport portion 31 and the discharge portion 32 may be driven by separate power sources. For example, a power source of the transport portion 31 is a transport motor, and a power source of the discharge portion 32 is a discharge motor.

The image sensor is not limited to a CMOS image sensor, and may be, for example, a metal oxide semiconductor (MOS) image sensor or a charge coupled device (CCD) image sensor.

The image sensor 42 is not limited to a linear image sensor, and may be an area image sensor.

Each functional constituent in the computer 60 is not limited to being realized by a CPU, but may be realized by hardware using an electronic circuit such as an application specific integrated circuit (ASIC) and a field-programmable gate array (FPGA), and may be realized by both software and hardware.

The image reading apparatus is not limited to a sheet feed type, but may be a flatbed type. When the flatbed type image reading apparatus is employed, a carriage that is movable along a sub-scanning direction (X direction) is provided in the main body, and the carriage is moved with a scanning motor as a power source. An image of an original document set on a glass plate of a platen is read by a light source and a reading portion provided on the carriage. The embodiments may also be applied to the flatbed type image reading apparatus as long as the image reading apparatus is provided with an automatic sheet feeder that automatically feeds original documents.

The image reading apparatus may be a part of a multifunction peripheral having a printing function and a copying function in addition to the scanner function.

A material of the original document is not limited to paper, and may be a film or a sheet made of resin, a woven fabric, a metal film, or the like.

Hereinafter, the technical concept understood from the above-described embodiments and modified examples will be described along with the effects.

A. The image reading apparatus is an image reading apparatus that reads an original document to acquire an image, and includes a first reading portion that reads a first side of the original document to acquire a first image, a second reading portion that reads a second side that is an opposite side to the first side of the original document to acquire a second image, and a control portion that performs a predetermined detection process on the first image and performs the predetermined detection process on the second image, in which, when the predetermined detection process is successful for the first image, the control portion performs, based on a value of an image processing variable specified from a detection result of the predetermined detection process, predetermined image processing on the first image, when the predetermined detection process is successful for the second image, the control portion performs, based on a value of an image processing variable specified from a detection result of the predetermined detection process, the predetermined image processing on the second image, and, when the predetermined detection process on an image of one side of the first side and the second side fails, the control portion specifies, based on a value of an image processing variable specified from a detection result of the predetermined detection process on an image of the other side for which the predetermined detection process is successful among the first side and the second side, a value of an image processing variable for the image of the one side, and performs, based on the specified value of the image processing variable, the predetermined image processing on the image of the one side.

According to this configuration, when the predetermined detection process of one of the first side and the second side fails, a value of an image processing variable for an image of one side is specified based on a value of an image processing variable specified from a detection result of the predetermined detection process on an image of the other side for which the predetermined detection process is successful among the first side and the second side, and the predetermined image processing is performed on the image of the one side based on the specified value of the image processing variable. Therefore, even when the detection process on the image of one side of the images obtained by reading both sides of an original document fails, it is possible to acquire the images of both sides of the original document subjected to appropriate image processing.

B. In the image reading apparatus, the predetermined detection process is a tilt angle detection process of detecting a tilt angle of an original document region in the image, the predetermined image processing is a tilt correction process of correcting a tilt of the original document region to be small, and when the tilt angle detection process on an image of one side of the first side and the second side fails, the control portion may specify, based on a detection result of the tilt angle detection process on an image of the other side for which the tilt angle detection process is successful among the first side and the second side, a tilt angle of an original document region in the image of the one side, and perform, based on the specified tilt angle, the tilt correction process on the image of the one side.

According to this configuration, when the tilt detection process on the image of one of the first side and the second side fails, a tilt angle of the original document region in the image of one side is specified based on a detection result (tilt angle) of the tilt detection process on the image of the other side for which the tilt detection process is successful among the first side and the second side, and the tilt correction process is performed on the image of one side based on the specified tilt angle. Therefore, even when the tilt detection process on the image of one side fails, it is possible to acquire images of both sides in which the original document regions are subjected to appropriate tilt correction.

C. In the image reading apparatus, the predetermined detection process is a region detection process of detecting an original document region in the image, the predetermined image processing is a cutout process of cutting out the original document region from the image, and when the region detection process on an image of one of the first side and the second side fails, the control portion may specify, based on a detection result of the region detection process on an image of the other side for which the region detection process is successful among the first side and the second side, an original document region in the image of the one side, and perform the cutout process of cutting out the specified original document region from the image of the one side.

According to this configuration, when the region detection process of detecting the original document region in the image of one of the first side and the second side fails, the original document region in the image of one side is specified based on the original document region that is the detection result of the region detection process of detecting the original document region in the image of the other side for which the region detection process is successful among the first side and the second side, and the cutout process of cutting out the specified original document region from the image of the one side is performed. Therefore, even when the region detection process on the image of one side fails, it is possible to acquire the images of both sides in which the original document regions are appropriately cut out.

D. In the image reading apparatus, the predetermined detection process includes a character detection process of detecting a character in the image, the predetermined image processing includes a rotation process of rotating the image by a rotation angle based on an orientation of the detected character, and when the character detection process on an image of one side of the first side and the second side fails, the control portion may specify, based on a detection result of the character detection process on the image of the other side for which the character detection process is successful among the first side and the second side, an orientation of the character in the image of the one side, and perform the rotation process of rotating the image of the one side by a rotation angle corresponding to the specified orientation of the character.

According to this configuration, even when a character in the image of one of the first side and the second side cannot be detected, an orientation of the character in the image of the one side is specified based on an orientation of the character detected in the image of the other side, and a rotation process of rotating the image of the one side by a rotation angle corresponding to the specified orientation of the character is performed. Therefore, even when the character detection process for one side of the original document fails, it is possible to acquire images of both sides in an appropriate orientation according to the orientation of the character.

E. In the image reading apparatus, the control portion acquires binding position information regarding a binding position of the original document, and when the character detection process of detecting a character in an image of one side of the first side and the second side fails, the control portion may specify, based on a detection result and the binding position information, the detection result being of the character detection process of detecting a character in an image of the other side for which the character detection process is successful among the first side and the second side, an orientation of the character in the image of the one side, and perform the rotation process of rotating the image of the one side by the rotation angle corresponding to the specified orientation of the character.

According to this configuration, the control portion acquires the binding position information of the original document. Even when the character detection process of detecting a character in the image of one of the first side and the second side of the original document fails, it is possible to more appropriately specify an orientation of the character in the image of the one side based on an orientation of the character in an image of the other side for which the character detection process is successful and the binding position information. Therefore, the image of one side can be rotated by a rotation angle according to the more appropriately specified orientation of the character. Therefore, even when the character detection process on the image of one side fails, it is possible to acquire images of both sides in a more appropriate orientation according to the orientation of the character.

F. In the image reading apparatus, by performing, as the predetermined detection process, a binding position detection process of detecting a binding mark on an image of at least one of the first side and the second side, the control portion may acquire the binding position information.

According to this configuration, the binding position information is acquired by performing the binding position detection process of detecting the binding mark on the image of at least one side of both sides of the original document. For example, there is no need to input the binding position information to the image reading apparatus by operating the operation portion. Therefore, even when the character detection process fails for one side of the original document, it is possible to acquire images of both sides in a more appropriate orientation according to the orientation of the character while reducing the time and effort for an input operation.

G. The image reading system is an image reading system including the image reading apparatus and the reading control device that is connected for communication to the image reading apparatus in a wired or wireless manner, and the reading control device includes an image processing section that performs, instead of the image reading apparatus, at least part of at least the predetermined image processing among the predetermined detection process and the predetermined image processing.

According to this configuration, since the reading control device configuring the image reading system shares at least part of image processing of the predetermined image processing, a processing load on the image reading apparatus can be reduced, and even when the predetermined detection process on an image fails, images of both sides subjected to appropriate image processing can be acquired.

H. The image reading method is an image reading method of reading an original document to acquire an image, and includes reading a first side and a second side of the original document, performing a predetermined detection process on a first image obtained by reading the first side of the original document and performing the predetermined detection process on a second image obtained by reading the second side that is an opposite side to the first side of the original document, and, when the predetermined detection process is successful for the first image, performing, based on a value of an image processing variable specified from a detection result of the predetermined detection process, predetermined image processing on the first image, when the predetermined detection process is successful for the second image, performing, based on a value of an image processing variable specified from a detection result of the predetermined detection process, the predetermined image processing on the second image, and, when the predetermined detection process on an image of one side of the first side and the second side fails, specifying, based on a value of an image processing variable specified from a detection result of the predetermined detection process on an image of the other side for which the predetermined detection process is successful among the first side and the second side, a value of an image processing variable for the image of the one side, and performing, based on the specified value of the image processing variable, the predetermined image processing on the image of the one side.

According to this method, even when the predetermined detection process on the image of one side fails, it is possible to acquire the images of both sides subjected to appropriate image processing.

I. A non-transitory computer-readable storage medium stores the program that is a program executed by a computer that performs a process of reading an original document to acquire an image, the program causing the computer to execute performing a predetermined detection process on a first image obtained by reading a first side of the original document and performing the predetermined detection process on a second image obtained by reading a second side that is an opposite side to the first side of the original document, and, when the predetermined detection process is successful for the first image, performing, based on a value of an image processing variable specified from a detection result of the predetermined detection process, predetermined image processing on the first image, when the predetermined detection process is successful for the second image, performing, based on a value of an image processing variable specified from a detection result of the predetermined detection process, the predetermined image processing on the second image, and, when the predetermined detection process on an image of one side of the first side and the second side fails, specifying, based on a value of an image processing variable specified from a detection result of the predetermined detection process on an image of the other side for which the predetermined detection process is successful among the first side and the second side, a value of an image processing variable for the image of the one side, and performing, based on the specified value of the image processing variable, the predetermined image processing on the image of the one side.

The computer executes the program, and, thus, even when the predetermined detection process on the image of one side fails, it is possible to acquire the images of both sides subjected to appropriate image processing.

What is claimed is:

1. An image reading apparatus that reads an original document to acquire an image, the image reading apparatus comprising:
   a first reading portion that reads a first side of the original document to acquire a first image;
   a second reading portion that reads a second side that is an opposite side to the first side of the original document to acquire a second image; and
   a control portion that performs a predetermined detection process on the first image and performs the predetermined detection process on the second image, wherein
   when the predetermined detection process is successful for the first image, the control portion performs, based on a value of an image processing variable specified from a detection result of the predetermined detection process, predetermined image processing on the first image,
   when the predetermined detection process is successful for the second image, the control portion performs, based on a value of an image processing variable specified from a detection result of the predetermined detection process, the predetermined image processing on the second image, and
   when the predetermined detection process on an image of one side of the first side and the second side fails, the control portion specifies, based on a value of an image processing variable specified from a detection result of the predetermined detection process on an image of an other side for which the predetermined detection process is successful among the first side and the second side, a value of an image processing variable for the image of the one side, and performs, based on the value of the image processing variable that is specified, the predetermined image processing on the image of the one side.

2. The image reading apparatus according to claim 1, wherein
   the predetermined detection process is a tilt angle detection process of detecting a tilt angle of an original document region in the image,
   the predetermined image processing is a tilt correction process of correcting a tilt of the original document region to be small, and
   when the tilt angle detection process on an image of one side of the first side and the second side fails, the control portion specifies, based on a detection result of the tilt angle detection process on an image of an other side for which the tilt angle detection process is successful among the first side and the second side, a tilt angle of an original document region in the image of the one side, and performs, based on the tilt angle that is specified, the tilt correction process on the image of the one side.

3. The image reading apparatus according to claim 1, wherein
   the predetermined detection process is a region detection process of detecting an original document region in the image,
   the predetermined image processing is a cutout process of cutting out the original document region from the image, and
   when the region detection process on an image of one side of the first side and the second side fails, the control portion specifies, based on a detection result of the region detection process on an image of an other side for which the region detection process is successful among the first side and the second side, an original document region in the image of the one side, and performs the cutout process of cutting out the original document region that is specified from the image of the one side.

4. The image reading apparatus according to claim 1, wherein
   the predetermined detection process includes a character detection process of detecting a character in the image,
   the predetermined image processing includes a rotation process of rotating the image by a rotation angle based on an orientation of the character that is detected, and
   when the character detection process on an image of one side of the first side and the second side fails, the control portion specifies, based on a detection result of the character detection process on an image of an other side for which the character detection process is successful among the first side and the second side, an orientation of a character in the image of the one side, and performs the rotation process of rotating the image of the one side by a rotation angle corresponding to the orientation of the character that is specified.

5. The image reading apparatus according to claim 4, wherein
   the control portion acquires binding position information regarding a binding position of the original document, and
   when the character detection process of detecting a character in an image of one side of the first side and the second side fails, the control portion specifies, based on a detection result and the binding position information, the detection result being of the character detection process of detecting a character in an image of an other side for which the character detection process is successful among the first side and the second side, an orientation of the character in the image of the one side, and performs the rotation process of rotating the image of the one side by the rotation angle corresponding to the orientation of the character that is specified.

6. The image reading apparatus according to claim 5, wherein by performing, as the predetermined detection process, a binding position detection process of detecting a binding mark on an image of at least one of the first side and the second side, the control portion acquires the binding position information.

7. An image reading system comprising:

the image reading apparatus according to claim 1; and a reading control device that is connected for communication to the image reading apparatus in a wired or wireless manner, wherein the reading control device includes an image processing section that performs, instead of the image reading apparatus, at least part of at least the predetermined image processing among the predetermined detection process and the predetermined image processing.

8. An image reading method of reading an original document to acquire an image, the image reading method comprising:

reading a first side and a second side of the original document;

performing a predetermined detection process on a first image obtained by reading the first side of the original document and performing the predetermined detection process on a second image obtained by reading the second side that is an opposite side to the first side of the original document; and when the predetermined detection process is successful for the first image, performing, based on a value of an image processing variable specified from a detection result of the predetermined detection process, predetermined image processing on the first image, when the predetermined detection process is successful for the second image, performing, based on a value of an image processing variable specified from a detection result of the predetermined detection process, the predetermined image processing on the second image, and, when the predetermined detection process on an image of one side of the first side and the second side fails, specifying, based on a value of an image processing variable specified from a detection result of the predetermined detection process on an image of an other side for which the predetermined detection process is successful among the first side and the second side, a value of an image processing variable for the image of the one side, and performing, based on the value of the image processing variable that is specified, the predetermined image processing on the image of the one side.

9. A non-transitory computer-readable storage medium storing a program executed by a computer that performs a process of reading an original document to acquire an image, the program causing the computer to execute:

performing a predetermined detection process on a first image obtained by reading a first side of the original document and performing the predetermined detection process on a second image obtained by reading a second side that is an opposite side to the first side of the original document; and when the predetermined detection process is successful for the first image, performing, based on a value of an image processing variable specified from a detection result of the predetermined detection process, predetermined image processing on the first image, when the predetermined detection process is successful for the second image, performing, based on a value of an image processing variable specified from a detection result of the predetermined detection process, the predetermined image processing on the second image, and, when the predetermined detection process on an image of one side of the first side and the second side fails, specifying, based on a value of an image processing variable specified from a detection result of the predetermined detection process on an image of an other side for which the predetermined detection process is successful among the first side and the second side, a value of an image processing variable for the image of the one side, and performing, based on the value of the image processing variable that is specified, the predetermined image processing on the image of the one side.

* * * * *